(12) United States Patent
Kaji

(10) Patent No.: US 6,760,131 B2
(45) Date of Patent: Jul. 6, 2004

(54) IMAGE SCANNER

(75) Inventor: Yukio Kaji, Kanazawa (JP)

(73) Assignee: PFU Limited, Ishikawa (JP)

(*) Notice: Subject to any disclaimer, the term of this patent is extended or adjusted under 35 U.S.C. 154(b) by 266 days.

(21) Appl. No.: 09/826,912

(22) Filed: Apr. 6, 2001

(65) Prior Publication Data
US 2001/0012132 A1 Aug. 9, 2001

Related U.S. Application Data

(62) Division of application No. 09/497,401, filed on Feb. 3, 2000, which is a division of application No. 08/989,139, filed on Dec. 11, 1997, now Pat. No. 6,122,077.

(30) Foreign Application Priority Data

Dec. 11, 1996 (JP) .............................. 8-330584
Dec. 11, 1996 (JP) .............................. 8-330585
Dec. 11, 1996 (JP) .............................. 8-330586

(51) Int. Cl.$^7$ .............................. H04N 1/04; H04N 1/46; G06K 9/00; G06K 9/40
(52) U.S. Cl. .................... 358/474; 358/516; 358/475; 382/167; 382/264
(58) Field of Search ............................. 358/464, 461, 358/474, 448, 465, 466, 475, 516; 382/167, 254

(56) References Cited

U.S. PATENT DOCUMENTS

| 5,321,526 A | | 6/1994 | Takenaka .................... 358/464 |
| 5,471,320 A | | 11/1995 | Jodoin et al. ................ 358/455 |
| 5,579,419 A | | 11/1996 | Yaguchi et al. ............. 382/305 |
| 5,689,347 A | * | 11/1997 | Naoi ........................... 358/444 |
| 5,710,640 A | * | 1/1998 | Suzuki ........................ 358/461 |
| 5,893,020 A | | 4/1999 | Atsumi | |
| 5,949,555 A | | 9/1999 | Sakai et al. ................. 358/462 |
| 6,055,066 A | * | 4/2000 | Kanda ........................ 358/461 |

FOREIGN PATENT DOCUMENTS

| DE | 32 36 840 A1 | 4/1984 |
| DE | 41 33 035 C2 | 4/1992 |
| JP | 55-85972 | 6/1980 |
| JP | 57-162085 | 10/1982 |
| JP | 61-131180 | 6/1986 |
| JP | 64-10782 | 1/1989 |
| JP | 3-96070 | 4/1991 |
| JP | 4-371072 | 12/1992 |
| JP | 5-207228 A | 8/1993 |
| JP | 7-58943 | 3/1995 |
| JP | 07-58943 | 3/1995 |
| JP | 7-170391 | 7/1995 |
| JP | 7-177347 | 7/1995 |
| JP | 7-298008 | 11/1995 |
| JP | 08-76301 | 3/1996 |
| JP | 8-138037 | 5/1996 |

* cited by examiner

Primary Examiner—Edward Coles
Assistant Examiner—Jason Sherrill

(57) ABSTRACT

An enhancement and interpolation circuit forms enhanced image data by performing enhancement and interpolation processing on image data. A floating slice circuit obtains a floating slice level for said image data. A binarization and density conversion circuit binarizes enhanced image data using the floating slice level to form binarized image data. In the double-side read mode, simultaneously read image data on the right and reverse sides of a document are transferred at a first rate. In the one-side read mode, image data on the right side of a document is transferred at a second rate that is slower than the first rate by data transfer means. An image discriminating circuit forms an image discriminating instruction for read image data. A white level signal generating circuit forms a new white level signal by subjecting said image data and a current white level signal in accordance with an operation designation instruction corresponding to an image discriminating instruction. This new white level signal is stored as the next white level signal.

9 Claims, 24 Drawing Sheets

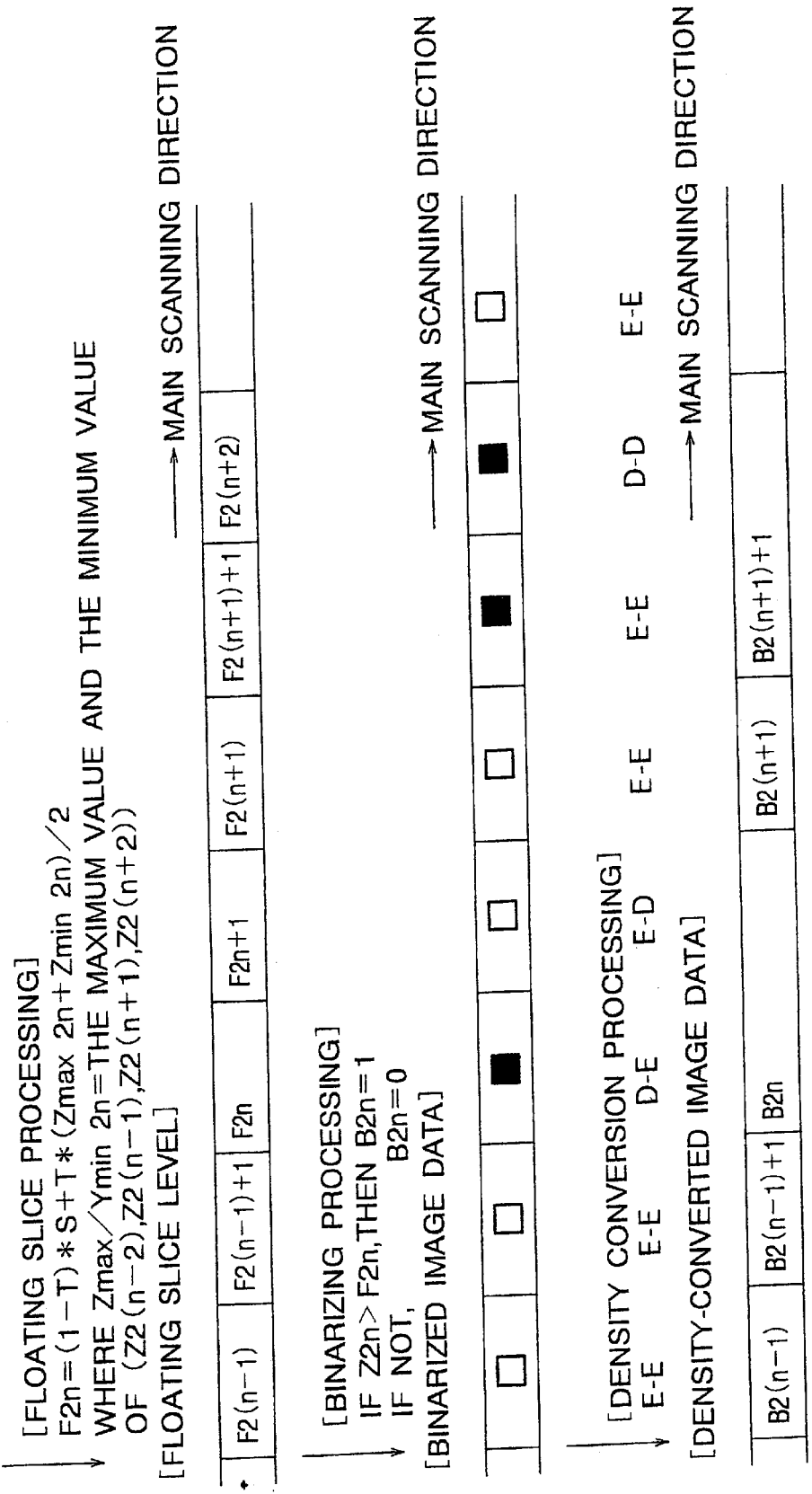

FIG. 8A
MARS — READ LINE
FIG. 8B
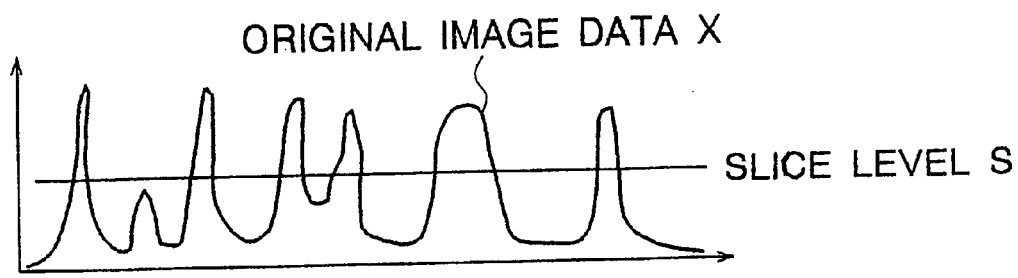
FIG. 8C
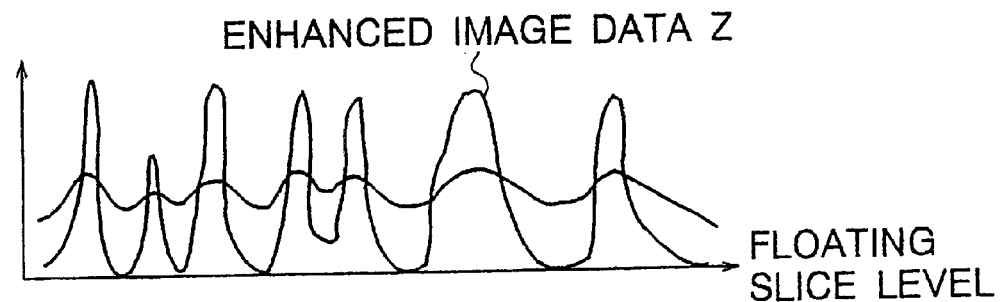

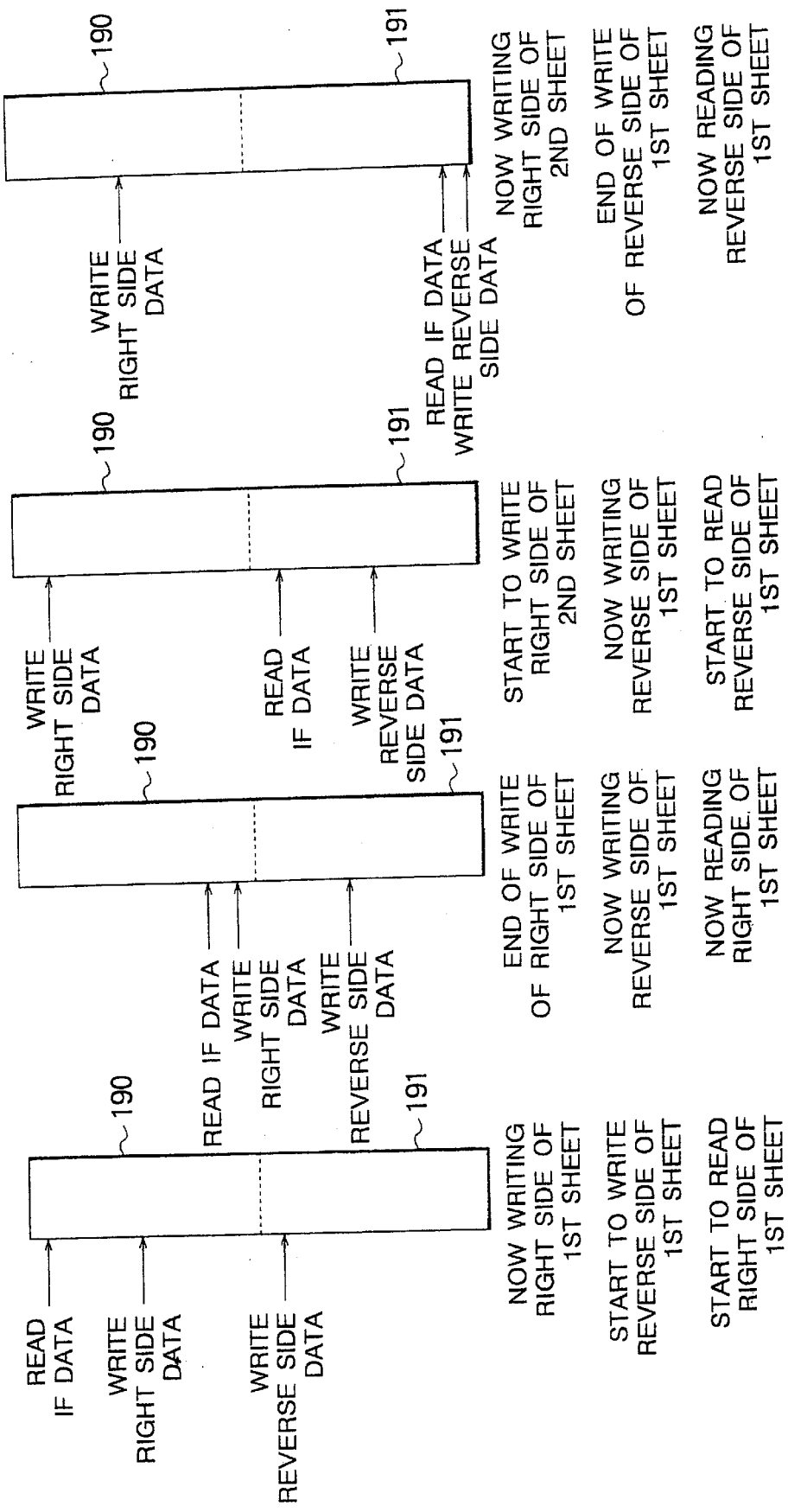

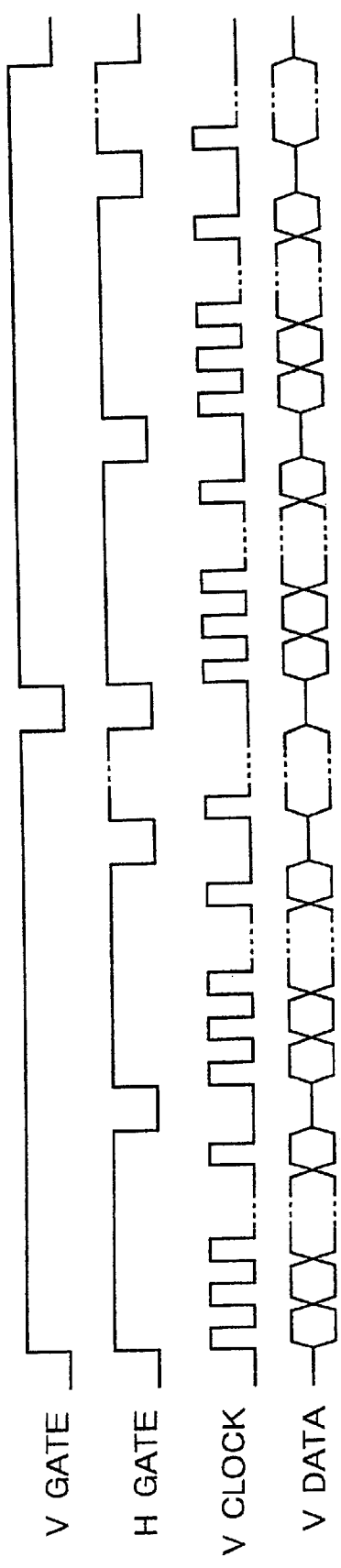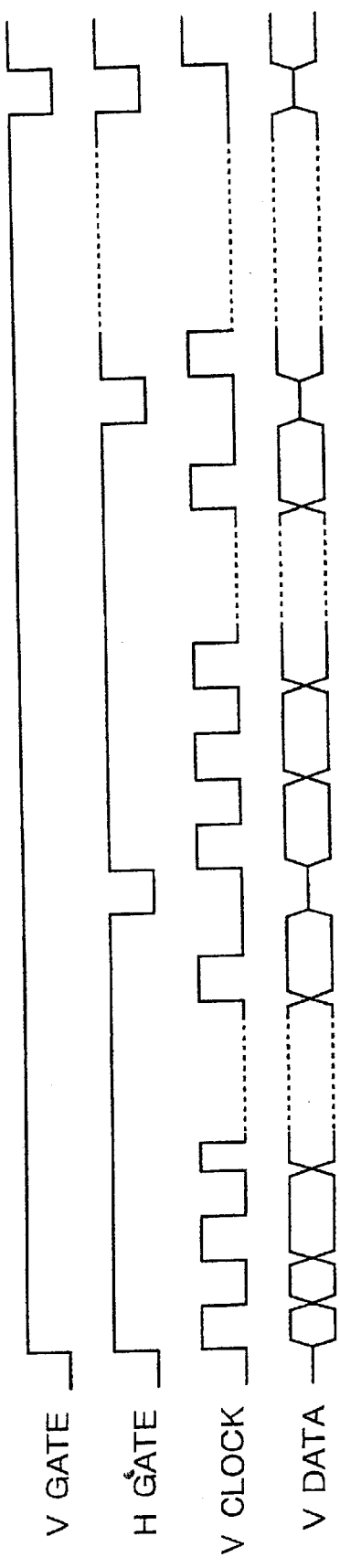

IMAGE SCANNER

CROSS REFERENCE TO RELATED APPLICATIONS

This application is a divisional of U.S. application Ser. No. 09/497,401, filed Feb. 3, 2000, now pending, which application Ser. No. 09/497,401 is a divisional application of U.S. application Ser. No. 08/989,139, filed Dec. 11, 1997, now issued as U.S. Pat. No. 6,122,077.

This application is based upon and claims priority of divisional U.S. application Ser. No. 09/497,401, filed Feb. 3, 2000, U.S. application Ser. No. 08/989,139, filed Dec. 11, 1997, and Japanese patent application nos. 8-330584, 8-330585, and 8-330586, all filed Dec. 11, 1996, the contents being incorporated herein by reference.

BACKGROUND OF THE INVENTION

The present invention relates generally to an image scanner with improved image processing speed, and more specifically to an image scanner in which a double-side read mode for reading image data on the right and reverse sides of a document with improved resolution through the optimum signal processing is provided to read image data on the right and reverse sides of a double-sided manuscript simultaneously and the read image data is transmitted to a host computer at high speed; the image data obtained being subjected to white level control.

Image scanners used for entering data in electronic filing systems are known as one of image input units for entering image data into computers. In banks, insurance companies and other financial institutions, for example, various items written on an enormous amount of business documents, such as contract documents produced in the course of business transactions, are entered into a computer. In order to perform input processing with accuracy and high speed and implement the retrieval of data, an electronic filing system is built, into which the contents of business documents are entered into a computer in the form of image data via electronic filing units as key components of the electronic filing system. Image scanners are therefore essential input units for entering the contents of business documents in the form of image data.

An image scanner acquires image data in the following manner: Assume that a plurality of business documents are placed by the operator on a document feeder. The image scanner feeds a sheet of business documents from the document feeder to a reader. The line sensor (CCD) of the reader reads image data, such as characters on the document, which are reduced by a data processor to a form that can be processed by a computer (that is, digital data, or binary image data). The data are then transferred to a host computer. Upon completion of reading, the document is discharged to a document discharge tray.

In general, image scanners are required to have high image quality for the image data read by them. Among a large number of competing products in the market, image scanners having a higher resolution in the same price range enjoy a greater demand. Resolution is basically determined by the reading accuracy of the optical system in the read means of the scanner. To improve the resolution of an image scanner, it is necessary to use the optical system of the read means with a higher reading accuracy.

The use of an optical system having too high a resolution, however, is not a practical approach because it tends to increase the cost of the image scanner. It is therefore desirable to increase the resolution of an optical system without changing the configuration of the optical system of the read means To this end, it is necessary to improve resolution indirectly by performing signal processing to improve resolution, instead of directly improving resolution through the improvement of the optical system as hardware.

Image scanners are also required to have an improved speed of reading image data. As in the case of resolution, an image scanner having higher read speed enjoys much demand. When improving resolution through signal processing, therefore, the signal processing must not impede the efforts to increase read rate. With too complex signal processing, real-time signal processing becomes impossible with increases in the amount of image data. Thus, it is necessary to implement the optimum signal processing for improving resolution.

Aside from the above discussion, there is a demand for entering contract provisions and other items on both the right and reverse sides of a contract document from considerations of paper saving and other social requests. Furthermore, it has been widely practiced to build an electronic filing system making use of its superior functions. Under these circumstances, image scanners are increasingly required to have a higher speed at which data are entered to handle the increasing amount of data to be entered into computer using image scanners.

Conventional image scanners, however, are mostly of a type that can read image data on only one side of a document, that is, a one-side scanning type. The use of a conventional image scanner to enter into a computer the image data in a document on both sides of which characters and other data (image data) are contained (double-sided document) involves two reading operations. Upon completion of the image scanner reading the image data on a right side of a document, the operator has to turn over the document discharged on the document feeder to cause the scanner to read the image data on the reverse side of the document. With this method, the reading of a double-sided document involves the intervention of the operator to turn over the document to cause the scanner to read the reverse side, requiring additional time for two reading operations and operator's paper handling. This imposes an obstacle in achieving high-speed image data entry.

Interfaces for image scanners in most of existing computers (or electronic filing systems) have been established as ones compatible with conventional image scanners (of the one-side scanner type). It is not desirable to change this established interface format. If a new interface for transferring the image data contained in a double-sided document is developed and adopted, the interface for double-sided scanning has to be added to the existing computers, posing a heavy burden to users. Consequently, image scanners capable of outputting the image data contained in a double-sided document are required to have connectivity to computers without changing the operating environment of the conventional one-side image scanners. In other words, it is necessary to increase the speed of double-side image scanners, while maintaining interchangeability with conventional image-data interfaces in both logical and physical terms.

The rate of image-data input cannot be improved if the image data read from a double-sided document are transferred to the computer at an existing data transfer rate. Transferring the amount of image data increased twice as much per unit time by reading both sides of a document at the existing data transfer rate could disturb the continuous supply of paper. It should be noted that the rate of image-data input processing is dependent on data transfer rate to the computer, rather than on the reading capacity (drive frequency) of the line sensor (CCD). This means that even when both sides of a document are read simultaneously, the computer throughput of documents per unit time remains almost the same (about ½ sheets). This also makes it necessary to increase data transfer rate.

Aside from the above discussion, there can be other means to increase the speed of image-data input. That is, the image data of a double-sided document can be obtained by reading the image data on the right and reverse sides of a document simultaneously with separately provided image-data read sensors each dedicated to read the right or reverse side. This is tantamount to virtually doubling image-data reading rate. Thus, the speed of image-data input processing can be increased by increasing (doubling) signal processing rate to form image data.

Consideration should be given here to white level control. When image data is formed by subjecting the read image data to a predetermined signal processing, image data must be read clearly regardless of the types of paper, whether wood-free paper or newsprint. It is necessary therefore to obtain improve contrast in the image, allowing for varied shades of document paper, and compensate for the uneven density of the manuscript, or changes in the amount of light of a light source. For this reason, white level control is carried out repeatedly during the period when the image data of a document is being read. A microprocessor for executing the control of the image scanner executes a white level control program at predetermined intervals. The execution of a white level control program is an interrupt processing to which high priority is given (see FIG. 20B). The white level control program changes the white level value from time to time in accordance with the degree of shades of paper, the uneven density of the manuscript, and changes in the amount of light of a light source. By doing so, image data on almost all types of paper can be read clearly.

The results of a study conducted by the present inventor revealed that it is almost impossible in practice to process the image data of a double-sided document that is twice as much as the amount of data on a single-sided document with conventional signal processing, particularly with white level control of the conventional type. Even when image data on the right and reverse sides of a document are read, means for reading image data clearly in accordance with changes in the shades of paper are essential. In this respect, white level control cannot be omitted. White level control, however, may place a burden on the microprocessor because the simultaneous reading of the right and reverse sides of a document inevitably doubles the amount of data being processed. In practice, the fact that white level control is performed as a high-priority interrupt processing may preclude the microprocessor from carrying out other processing for controlling the image scanner.

A (higher-speed) microprocessor having excellent signal processing performance can be used for controlling the image scanner. With this arrangement, the above problem can be solved, but the cost of the image scanner may increase only to realize white level control. This makes this approach impractical.

SUMMARY OF THE INVENTION

It is an object of the present invention to provide an image scanner whose resolution is improved by subjecting the read image data to the optimum signal processing.

It is another object of the present invention to provide an image scanner whose resolution is improved and whose reading rate is increased by subjecting the read image data to the optimum signal processing.

It is still another object of the present invention to provide an image scanner capable of reading image data on the right and reverse sides of a double-sided document simultaneously and transferring image data to a host computer with high speed.

It is a further object of the present invention to provide an image scanner in which the transfer rate of image data on the right and reverse sides of a double-sided document is made variable.

It is still a further object of the present invention to provide an image scanner capable of reading image data on the right and reverse sides of a double-sided document and subjecting the read image data to white level control.

The image scanner according to the present invention comprises read means for reading image data on paper, and signal processing means for producing image data by subjecting the image data read by the read means to predetermined operations. The signal processing means comprise a data signal generating circuit for producing image data by subjecting the image data read by the read means to predetermined processing, and a resolution enhancement circuit for producing binarized image data by subjecting the image data produced by the data signal generating circuit. The resolution enhancement circuit comprises an enhancement and interpolation circuit for producing interpolated and enhanced image data by subjecting the image data formed by the data signal generating circuit to enhancement processing and interpolation processing, a floating slice circuit for obtaining a floating slice level at which the level of the image data produced by the data signal generating circuit changes with image data values in the neighborhood of that image data, and a binarization and density conversion circuit for producing binarized image data by binarizing the image data interpolated and enhanced by the enhancement and interpolation circuit using the floating slice level from the floating slice circuit.

Furthermore, the image scanner according to the present invention is connected to a host computer to transfer data in accordance with a predetermined interface between the scanner and the host computer. The image scanner comprises first read means for a double-side read mode for reading image data on the right side of paper, second read means for a double-side read mode for reading image data on the reverse side of paper, third read means for a one-side read mode for reading image data on the right side of paper at a different location from the first read means, read control means for controlling the first and second read means in such a manner as to read image data on the right and reverse sides of paper simultaneously and controlling the third read means in such a manner as to read image data on the right side of paper, signal processing means for producing image data on the right and reverse sides of paper by subjecting the image data read by the first through third read means to predetermined operations, and data transfer means for transferring the image data on the right and reverse sides of paper formed by the signal processing means to a host computer in accordance with a predetermined interface.

The image scanner according to the present invention, moreover, comprises first read means for reading image data on the right side of paper, second read means for reading image data on the reverse side of paper, read control means for controlling the first and second read means in such a manner as to read image data on the right and reverse sides of paper simultaneously, and signal processing means for producing image data on the right and reverse sides of paper by subjecting the image data simultaneously read by the first and second read means under the control of the read control means to predetermined operations. The signal processing means comprises a white level control circuit for calculating a white level based on the image data read by the first and second read means, and a data signal generating circuit for producing image data from the image data read by the first and second read means using the white level calculated by the white level control circuit. The white level control circuit comprises a sequence circuit for controlling the execution of white level control that varies in accordance with image data reading steps, an image discriminating circuit for producing an image discriminating instruction by judging the state of the image data read by the first and second read means under the control of the sequence circuit, a white level signal generating circuit for forming a new white level signal by subjecting the current white level signal to predetermined operations in accordance with a predetermined operation designating instruction corresponding to the image discriminating instruction generated by the image discriminating circuit under the control of the sequence circuit, and a white level memory for storing a new white level signal generated by the white level signal generating circuit as the next white level signal.

BRIEF DISCRIPTION OF THE DRAWINGS

FIG. 7 is a diagram of assistance in explaining resolution enhancement processing.

FIG. 8 is a diagram of assistance in explaining resolution enhancement processing.

FIG. 16 is a diagram of assistance in explaining an image memory.

FIG. 17 is a diagram of assistance in explaining data transfer.

DESCRIPTION OF THE PREFERRED EMBODIMENTS (Embodiment 1)

Figure 1:
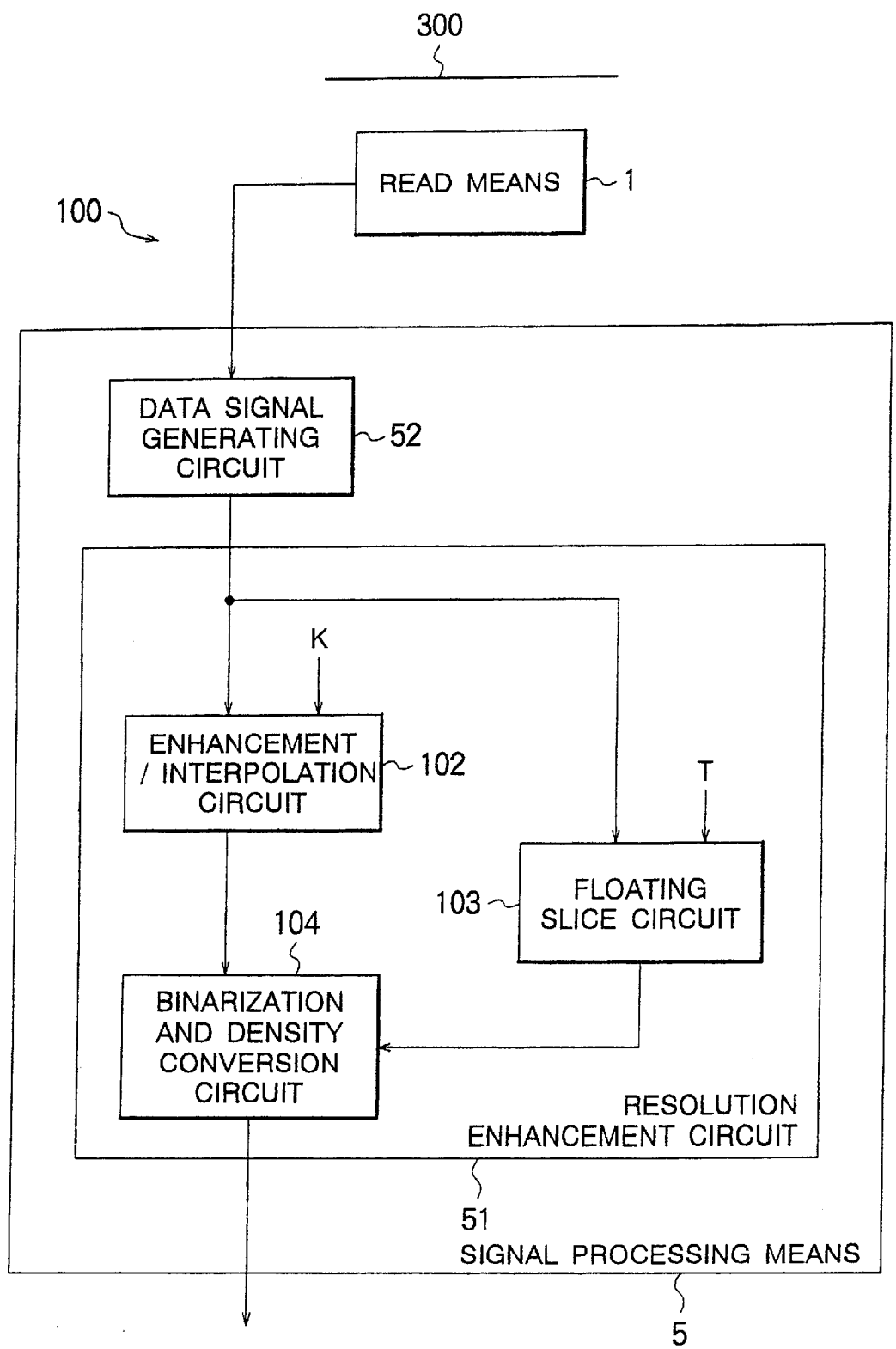
FIG. 1 is a block diagram illustrating the operating principle of a first embodiment of the present invention.

FIG. 1 is a block diagram illustrating the operating principle of an image scanner 100, which is a first embodiment of the present invention. The image scanner 100 comprises read means 1 for reading image data on a document 300, and signal processing means 5 for producing image data by subjecting the image data read by the read means 1 to predetermined operations. The signal processing means 5 comprises a data signal generating circuit 52 for producing image data by subjecting the image data read by the read means 1 to predetermined processing, and a resolution enhancement circuit 51 for producing binarized image data by subjecting the image data formed by the data signal generating circuit 52 to predetermined operations.

The resolution enhancement circuit 51 comprises an enhancement and interpolation circuit 102 for producing interpolated and enhanced image data by subjecting the image data formed by the data signal generating circuit 52 to enhancement processing and interpolation processing, a floating slice circuit 103 for obtaining a floating slice level which varies in accordance with the value of image data in the neighborhood of the image data produced by the data signal generating circuit 52, and a binarization and density conversion circuit 104 for producing binarized image data by binarizing the interpolated and enhanced image data output by the enhancement and interpolation circuit 102 using the floating slice level from the floating slice circuit 103.

In the image scanner according to the present invention, enhanced and interpolated image data is produced by subjecting the read image data to enhancement processing and interpolation processing, and the enhanced and interpolated image data is then sliced and binarized using the floating slice level. The floating slice level fluctuates in accordance with the value of image data in the neighborhood of that image data. Since this can seemingly improve resolution, resolution can be increased without changing the configuration of the optical system of the read means 1. That is, resolution can be seemingly increased through signal processing without resort to the improvement of the optical system. Consequently, resolution can be improved without significantly increasing the cost of the image scanner 100.

Since signal processing by the image scanner of the present invention is simple, real-time signal processing is possible even when the amount of image data is increased. Thus, the signal processing never hampers the process of increasing the rate of reading. That is, not only resolution can be improved but also the rate of reading can also be increased by adopting the optimum signal processing for improving resolution.

For the convenience of explanation, the double-side read mode and the one-side read mode for the image scanner 100 of the present invention will be described in the following.

Figure 2:
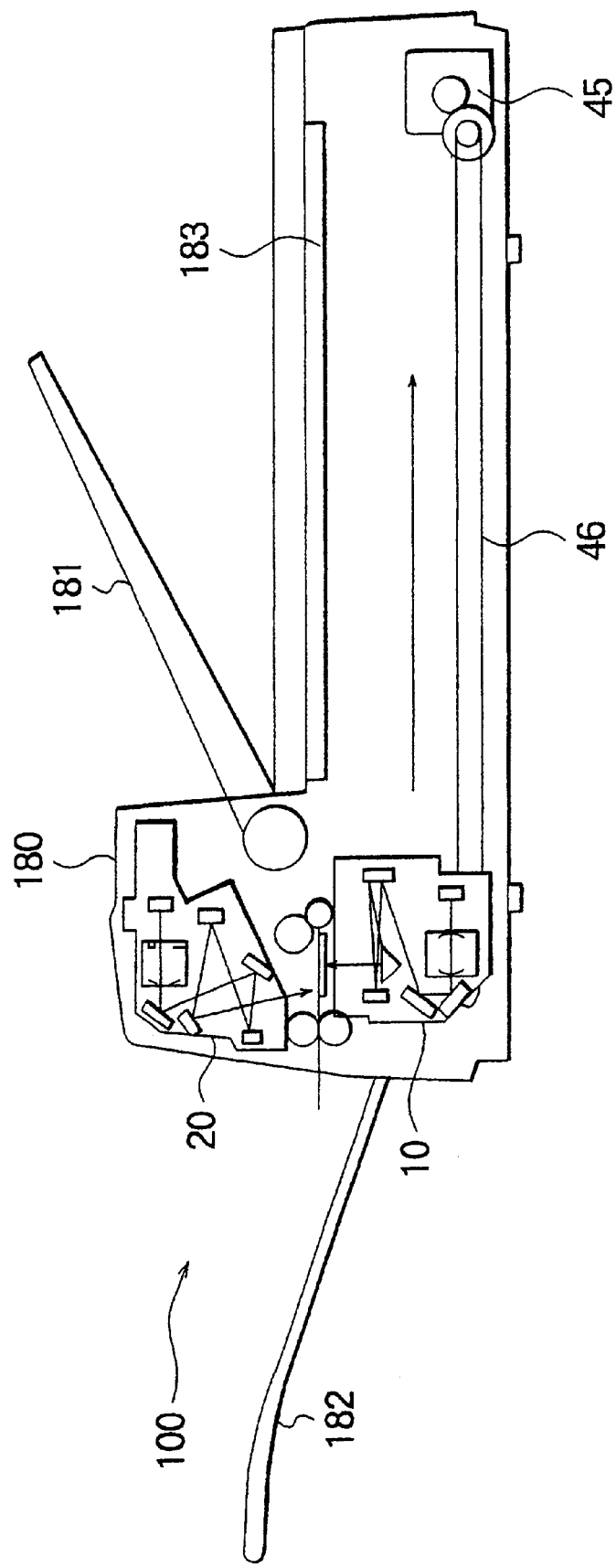
FIG. 2 is a diagram of assistance in explaining the construction of an image scanner.
Figure 3:
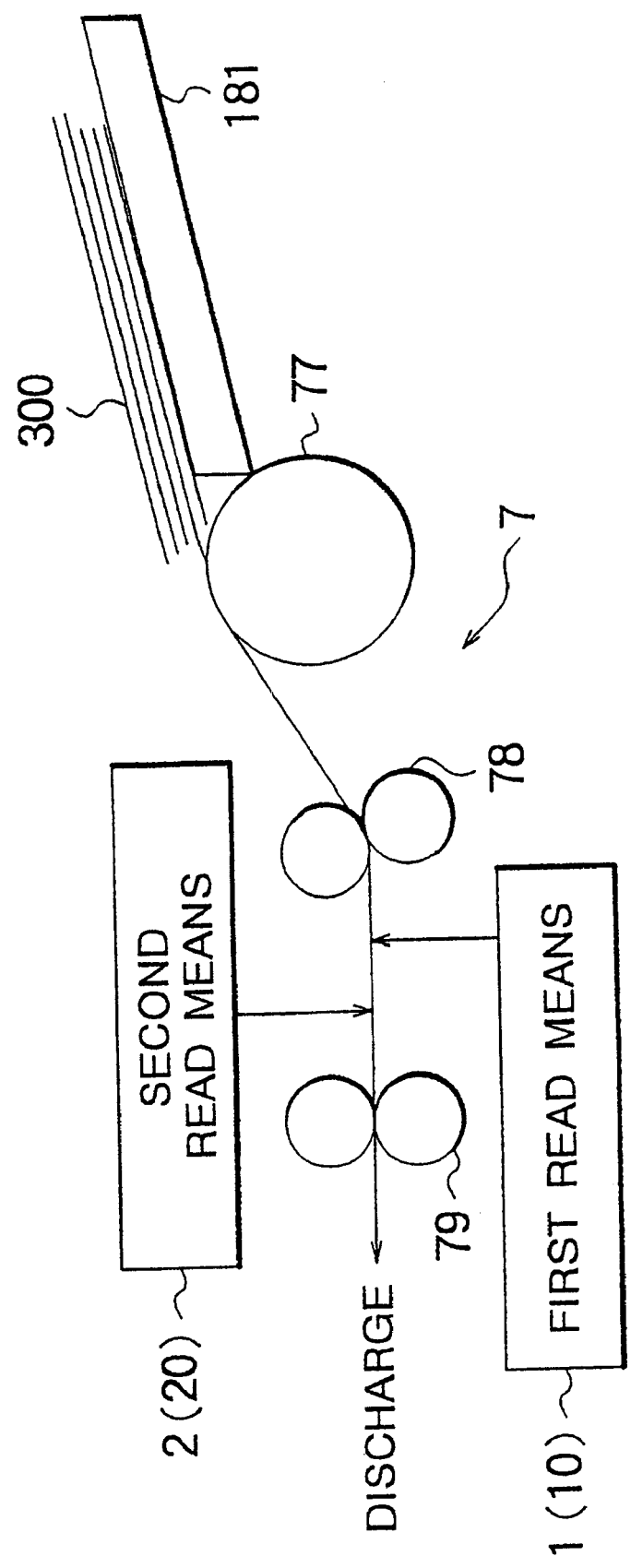
FIG. 3 is a diagram of assistance in explaining the construction of an image scanner.

FIGS. 2 and 3 show the construction of the image scanner 100. The image scanner 100 comprises an optical unit for reading the right side 10 as a key component of the (first) read means 1, and an optical unit for reading the reverse side 20 as a key component of the (second) read means 2, both housed in a chassis 180. Each of the optical unit for reading the right side 10 and the optical unit for reading the reverse side 20 has a known light source, lens system, line sensor (CCD) for reading image data.

The optical unit for reading the reverse side 20, which is used only in the double-side read mode, is fixedly fitted to the chassis 180. The optical unit for reading the right side 10, which is used in both the double-side read mode and the one-side read mode, is provided movably in a predetermined direction (as a carrier type). The optical unit for reading the right side 10 is disposed at a location shown in FIG. 2 and used as a key component of the first read means 1 in the double-side read mode, and moved in the direction shown by an arrow in FIG. 2 in the one-side read mode.

In the double-side read mode, multiple sheets of the document 300 are placed on a document stacker 181, and fed automatically one by one to the first and second read means 1 and 2, as shown in FIGS. 2 and 3. In this respect, the double-side read mode is also an ADF (auto document feeder) mode. The document 300 is fed to the first and second read means 1 and 2 via a document feed means 7 consisting chiefly of a pick roller 77, feed rollers 78 and 79 (and a motor 45). The document feed means 7 feed the document 300 by feeding the document sheets at a predetermined rate in a predetermined direction (sub-scanning direction). Sheets of the document 300 are picked up one by one by the pick roller 77, fed to the feed rolling 79 via a predetermined read location by the feed rolling 78, and discharged onto a document discharge tray 182. During this period, the document 300 is moved in a predetermined direction, while the first and second read means 1 and 2 remain stationary. The travel speed of the document 300 is set to a predetermined constant speed.

The first and second read means 1 and 2 read image data on the document 300 at their respective predetermined read locations. As shown in FIG. 3, the read locations of the first and second read means 1 and 2 are adapted to be slightly staggered with each other in the feeding direction of the document 300. That is, the read location of the first read means 1 is slightly on the upstream side of that of the second read means 2 in the feeding direction of the document 300.

With this arrangement, the first and second read means 1 and 2 are prevented from interfering with each other during image data reading. When light is irradiated onto the document 300 from the light sources of the optical unit for reading the right side 10 and the optical unit for reading the reverse side 20, and the reflected light is sensed by the line sensors, the light would penetrate through the document 300 if both the read means 1 and 2 read the document 300 at the same read location. As a result, the image data on the right side may be erroneously read as that of the reverse side, and vice versa. The staggering amount of the read locations of the first and second read means 1 and 2 is determined in terms of structural design so that both the read means 1 and 2 do not interfere with each other.

In the one-side read mode, only one sheet of the document 300 is placed on a flat platen (platen glass) 183 by the operator, with the right side of the document 300 down (facing the side of the platen 183), as shown in FIG. 2. The optical unit for reading the right side 10 is moved to a start position below the platen 183 prior to the start of the one-side read mode, and then moved at a predetermined speed in the direction shown by the arrow in FIG. 2 (sub-scanning direction) during the period of the one-side read mode. The optical unit for reading the right side 10 is moved by a (stepping) motor 45 and a belt 46. During the movement of the optical unit for reading the right side 10, the document 300 is held stationary on the platen 183.

The sub-scanning direction is the direction in which the document 300 is fed, and at the same time the direction in which the optical unit for reading the right side 10 is moved. The sub-scanning direction agrees with the longitudinal direction of the document 300. The main scanning direction is the direction in which the first and second read means 1 and 2 read image data on the document 300, and agrees with the transverse direction of the document 300. That is, the main scanning direction is at right angles to the sub-scanning direction.

Figure 4:
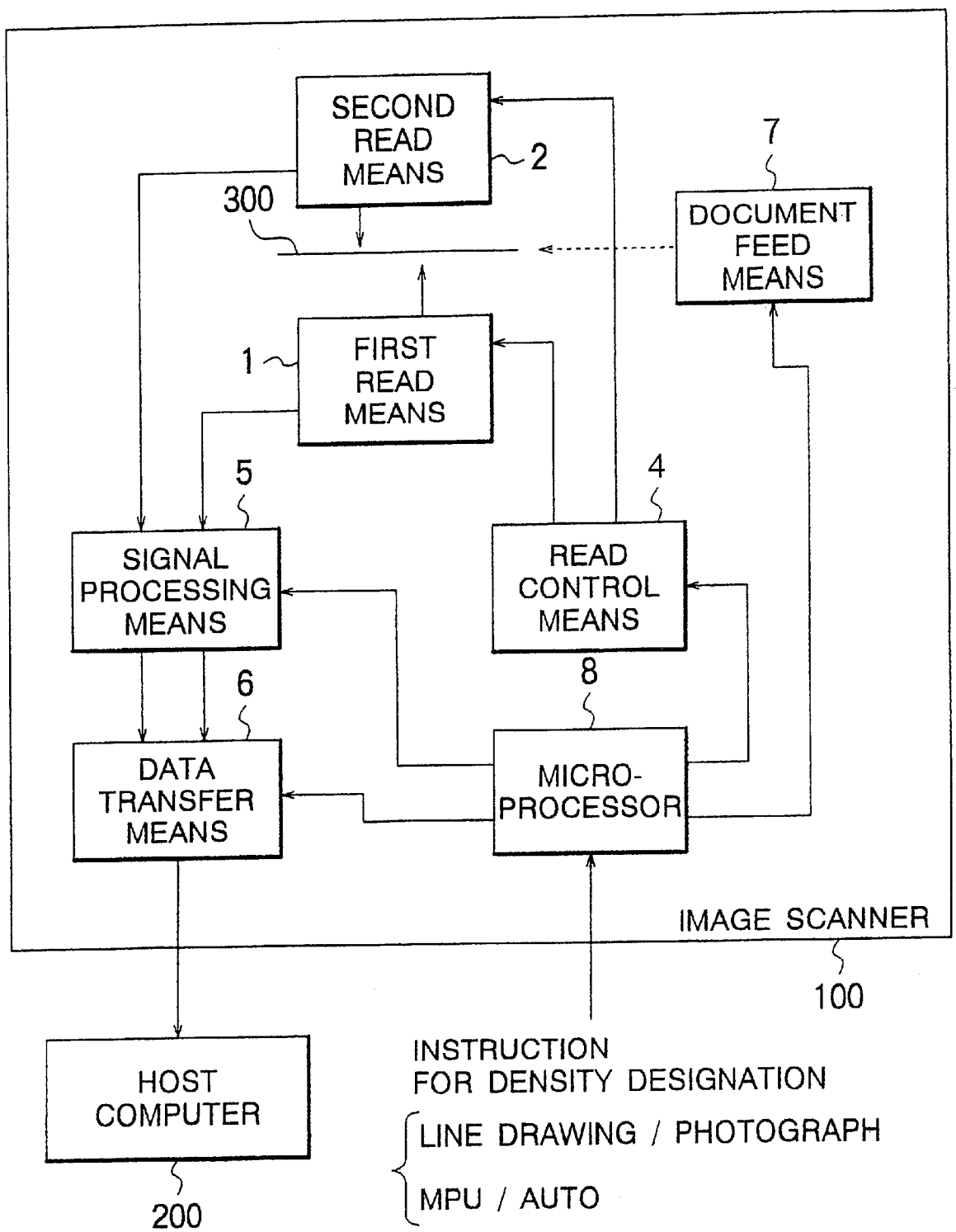
FIG. 4 is a block diagram of an image scanner.

FIG. 4 shows the configuration of the image scanner 100. The image scanner 100 is connected to a host computer 200, and transfers image data to the host computer 200. This allows the image data read from the document 300 to be entered into the host computer 200.

A microprocessor 8 control the image scanner 100 as a whole by controlling read control means 4, signal processing means 5, data transfer means 6 and document feed means 7. The microprocessor 8 changes over from the double-side read mode to the one-side read mode, or vice versa in accordance with a predetermined instruction given by the operator from the outside of the image scanner 100. The microprocessor 8 generates control signals necessary for executing these modes to enter into the read control means 4, etc. The microprocessor 8 designates density levels in resolution enhancement processing in accordance with a predetermined instruction given by the operator from the outside of the image scanner 100.

In the third embodiment, which will be described later, the microprocessor 8 changes over white level control modes (changeover between line drawing/photograph modes, or changeover between MPU/Auto modes) in accordance with a predetermined instruction given by the operator from the outside of the image scanner 100.

Figure 14:
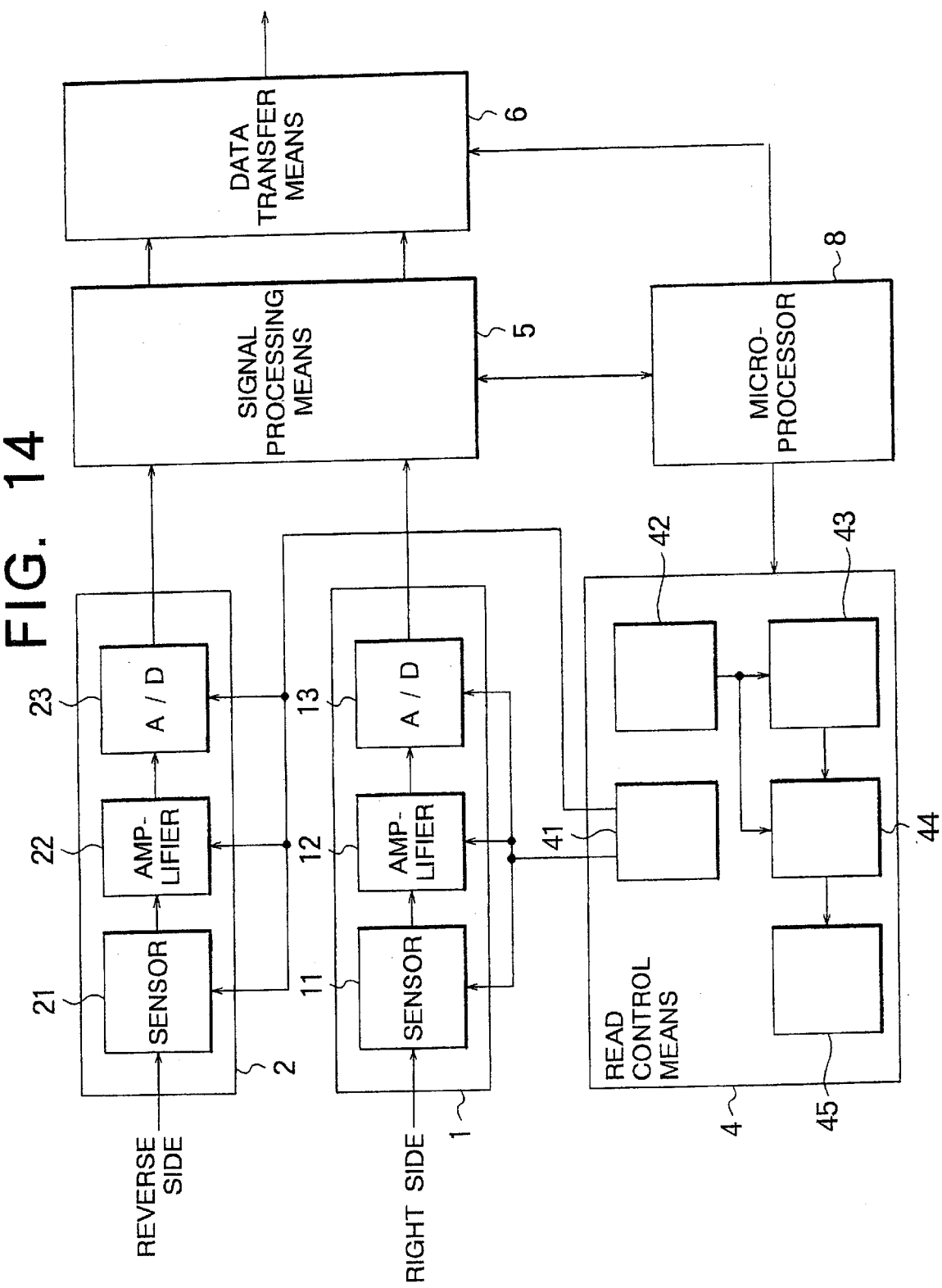
FIG. 14 is a block diagram of an image scanner.

The first read means 1 comprises a line sensor, an amplifier, and an analog/digital converter (see FIG. 14.) The line sensor comprises a CCD, and generates image signals (analog signals) corresponding to image data on the document 300. The analog output of the line sensor is amplified to a predetermined level by the amplifier, converted to a digital signal which is in turn entered into the signal processing means 5. The aforementioned digital signal is a signal of eight bits (256 gradations) per picture element.

The second read means 2 also has the same construction as the first read means 1. In the double-side read mode, both the digital signal for the right side of the document from the first read means 1 and the digital signal for the reverse side of the document 300 from the second read means 2 are entered almost in parallel with each other into the signal processing means 5. In the one-side read mode, on the other hand, (only) the digital signal for the right side of the document 300 from the first read means 1 is entered. As noted earlier, the leading ends and trailing ends of digital signals from the first and second read means 1 and 2 are slightly shifted in the double-side read mode because the read locations of the first and second read means 1 and 2 are slightly staggered. Notwithstanding, it can be considered that the first and second read means 1 and 2 read image data substantially simultaneously.

The read control means 4 generates control signals necessary for controlling the line sensor, amplifier and analog/ digital converter of the first and second read means 1 and 2, and control them. The read control means 4 generates control signals necessary for controlling the motor 45, and controls it (see FIG. 14.) In practice, two systems of the read control means 4 are provided to control each of the first and second read means 1 and 2 separately. The motor 45 comprises a (stepping) motor of the ADF type for feeding the document 300 in the double-side read mode, and a (stepping) motor for driving the first read means 1 in the sub-scanning direction in the one-side read mode.

The signal processing means 5 carries out predetermined signal processing by performing predetermined operations on the digital signals entered from the first and second read means 1 and 2 to generate optimized image data (binary image data). The resolution enhancement circuit 51 (see FIG. 1) of the signal processing means 5 performs the resolution enhancement processing on the entered image data (digital signals) to improve resolution, and then the binarization processing to binarize the image data (into two digits representing white and black). Since the signal processing carried out by the resolution enhancement circuit 51 is a simple one, even the image data twice as much as that with the conventional method fed by the first and second read means 1 and 2 can be processed real-time to generate binarized signals. The data signal generating circuit 52 (see FIG. 1) of the signal processing means 5 generates image data to be fed to the resolution enhancement circuit 51. The data signal generating circuit 52 generates optimized image data by subjecting the read image data to well-known shading compensation processing, gradation correction through gamma conversion, for example. Aside from this, the signal processing means 5 carries out well-known white level control processing, MTF correction (image enhancement) processing, scaling processing, line drawing binarizing processing through fixed slicing or floating slicing, and photograph binarizing processing through dither technique or error diffusion method on entered digital signals. The optimized image data is data of 8 bit per picture element or 1 bit per picture element (8 bits for 8 picture element), for example. In practice, two systems of the signal processing means 5 are provided to cover each of the first and second read means 1 and 2, with part of the processing circuits thereof shared by the two systems.

The data transfer means 6 transfers the optimized imaged data entered by the signal processing means 5 to the host computer 200. The image data to be transferred is the image data read from the right and reverse sides of the document 300 by the first and second read means 1 and 2 in the double-side read mode, or (only) the image data read from the right side of the document 300 by the first read means 1 in the one-side read mode.

The configuration shown in FIGS. 2 through 4 above is a common configuration not only for the image scanner in Embodiment 1 but for the image scanners in Embodiments 2 and 3. Duplicated description has therefore been omitted in Embodiments 2 and 3.

Figure 5:
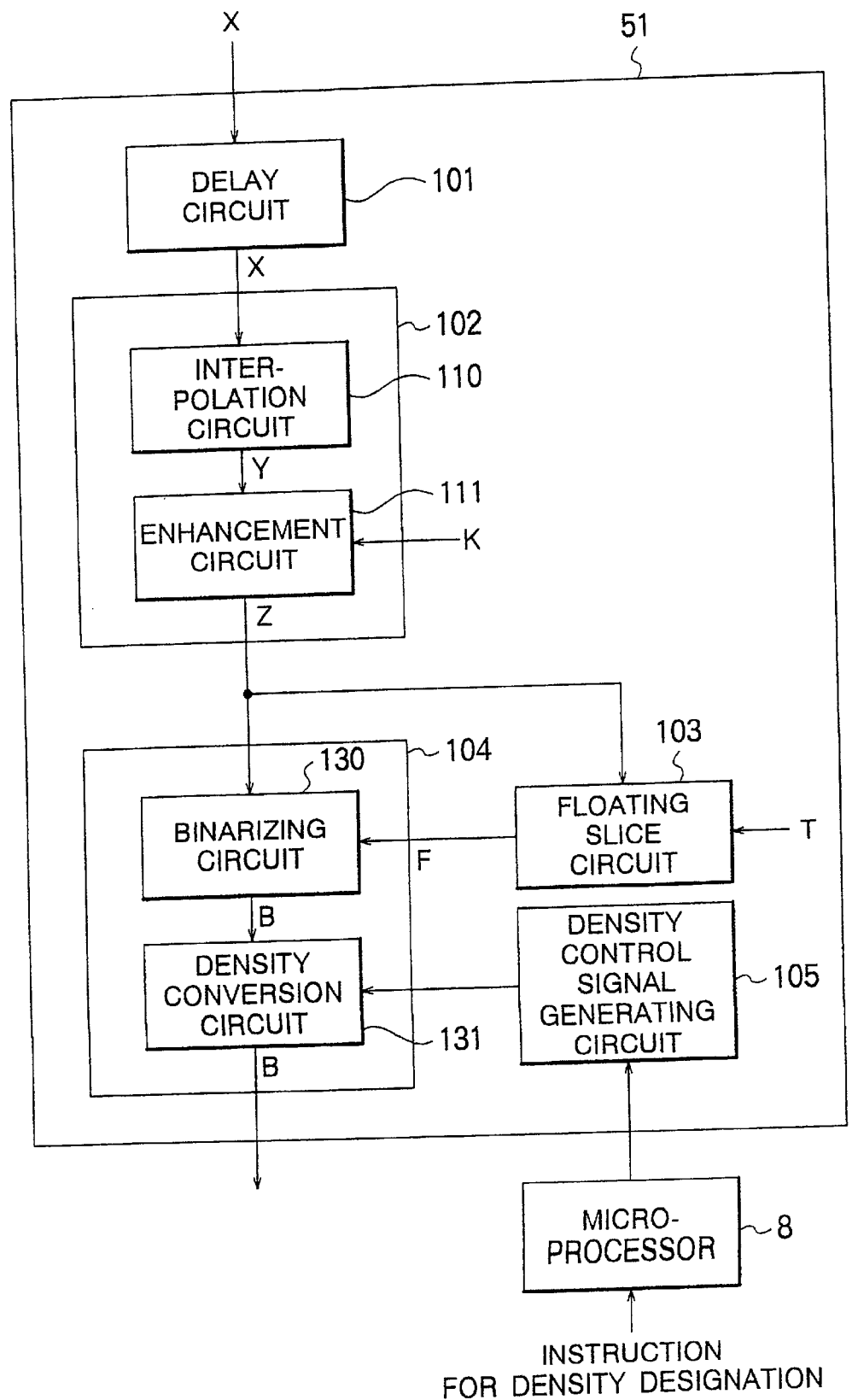
FIG. 5 is a block diagram of a resolution enhancement circuit.
Figure 6:
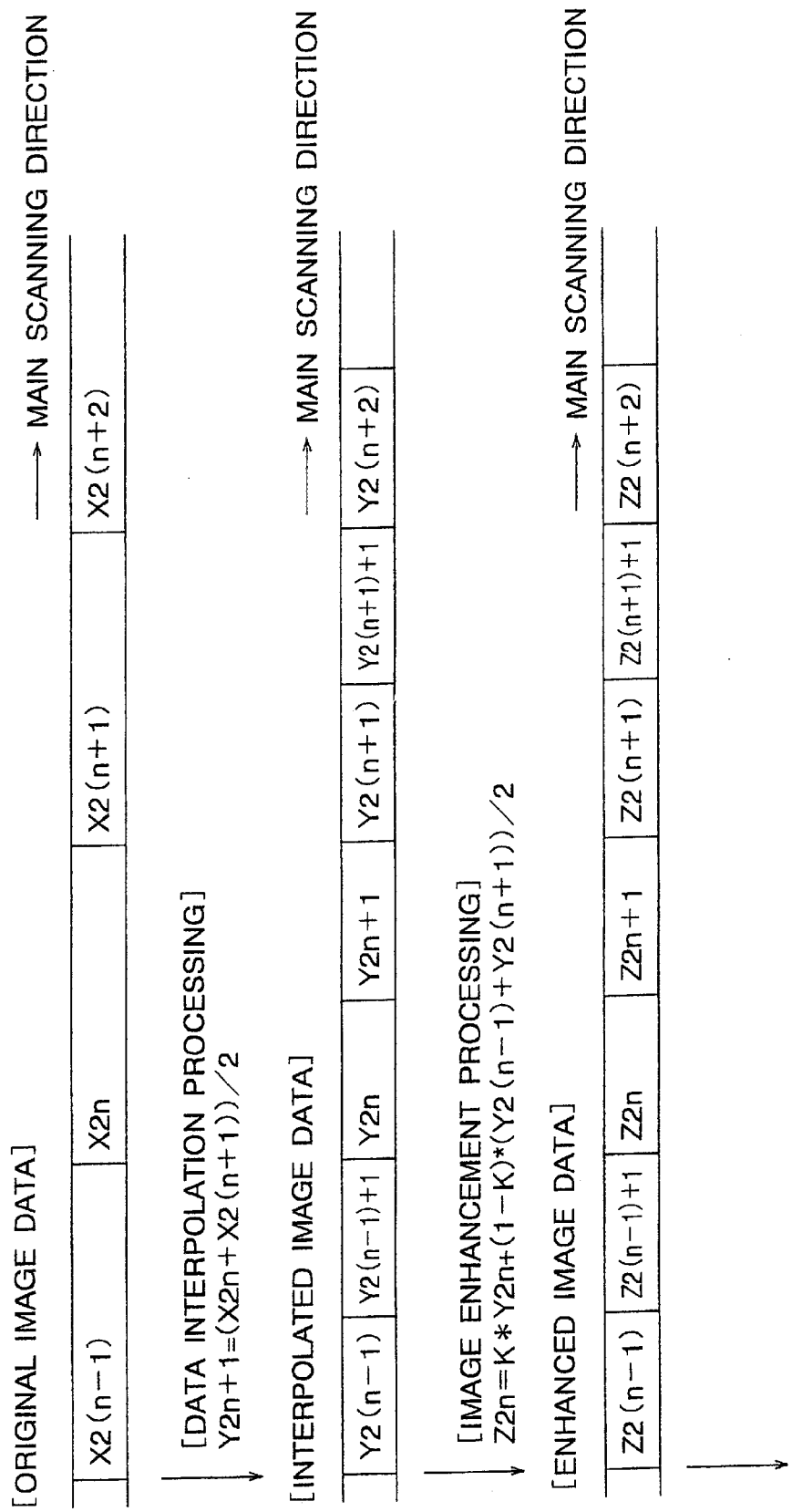
FIG. 6 is a diagram of assistance in explaining resolution enhancement processing.

FIGS. 5 through 8 show resolution enhancement processing. FIG. 5 shows the configuration of the resolution enhancement circuit 51. FIGS. 6 and 7 shows the state of resolution enhancement processing of image data. FIG. 8 conceptually shows the results of resolution enhancement processing. Both FIGS. 6 and 7 form a figure showing the processing in the same main scanning direction (that is, in the same read line).

As shown in FIG. 5, the resolution enhancement circuit 51 comprises a delay circuit 101, an enhancement and interpolation circuit 102, a floating slice circuit 103, a binarization and density conversion circuit 104, and a density control signal generating circuit 105.

In the delay circuit 101, the image data (original image data X) from the data signal generating circuit 52 is entered. Each of the original image data X is image data for a picture element consisting of 8-bit (256-gradation) digital data The original image data X is arranged in such a manner as - - - X $2(n-1)$, X $2n$, X $2(n+1)$, X $2(n+2)$, - - - in the main scanning direction, as shown in FIG. 6.

The digital signal obtained by converting the analog signal read by the line sensor is called the original image data, represented by X. Note that n is a positive integer; its upper limit being dependent on the number of picture elements in a line of the line sensor. The read picture element X is suffixed by $2n$, etc. (that is, by even numbers) for the convenience of expression in inserting the interpolated image data between them. In the following description, the picture element which is subjected to resolution enhancement processing (picture element in question) at the current moment is assumed to be X $2n$ for convenience of explanation.

The original image data X is entered from the delay circuit 101 to the enhancement and interpolation circuit 102 at a predetermined timing. The delay circuit 101 generates not only the original image data for the picture element in question X $2n$ but also the original image data for a plurality of picture elements before and behind X $2n$ that are necessary for processing. The enhancement and interpolation circuit 102 performs interpolation and enhancement processing on the original image data X to form and output the enhanced and interpolated image data Z. The enhanced and interpolated image data Z is entered into the binarization and density conversion circuit 104. The enhancement and interpolation circuit 102 comprises an interpolation circuit 110 and an enhancement circuit 111. The interpolation circuit 110 performs interpolation processing on the original image data X using the image data for the picture element in question and that for the next picture element to form interpolated image data Y. The interpolated image data Y has an amount of data twice as much as the original image data X because one set of interpolation data is inserted between each of the original image data X. That is, resolution can be seemingly doubled. The enhancement circuit 111 performs enhancement processing on the interpolated image data Y output by the interpolation circuit 110 using the image data for picture elements before and behind the picture element in question to produce the enhanced image data (that is, enhanced and interpolated image data) Z.

The interpolation circuit 110 performs interpolation processing on the data for the picture element in question to obtain the value of picture element to be interpolated between the picture element in question X $2n$ and a picture element X $2(n+1)$ immediately behind X $2n$. To this end, the interpolation circuit 110 performs a predetermined operation, Y $2n+1=(X\ 2n+X\ 2(n+1))/2$, to obtain the interpolated picture element Y $2n+1$. This processing is to obtain the mean value of the image data of the picture element in question X $2n$ and the image data of the picture element X $2(n+1)$ immediately behind X $2n$. By repeating this processing in sequence, interpolated image data Y arranged in such a manner as - - - Y $2(n-1)$, Y $2(n-1)+1$, Y $2n$, Y $2n+1$, Y $2(n+1)$, Y $2(n+1)+1$, Y $2(n+2)$, - - - in the main scanning direction can be obtained, as shown in FIG. 6. The read image data X $2n$, etc. which requires no interpolation, have the relationship of X $2n=Y\ 2n$, etc.

The enhancement circuit 111 performs image enhancement processing to change the interpolated image data Y $2n$ to a value that enhances Y 2n. To this end, the enhancement circuit 111 performs a predetermined operation, $Z\ 2n = K \times Y\ 2n + (1-K) \times (Y\ 2(n-1) + Y\ 2(n+1))/2$, to enhance the interpolated image data Y 2n. This processing is the processing to increase the amplitude of signal, or the processing to obtain the enhanced signal as a function having as variables the image data for picture elements before and behind the picture element in question X 2n, that is, Y 2(n−1) and Y 2(n+1).

The enhancement circuit 111 uses an enhancement coefficient K determined by the characteristics of the equipment or specified by the operator. The larger than "1" the coefficient K is, the larger becomes its enhancement effect. Since too large the coefficient K could disturb gradation performance, the coefficient K is set to an appropriate value in accordance with the characteristics of the equipment, or specified by the operator. By repeating this processing in sequence, enhanced image data Z arranged in such a manner as - - - Z 2(n−1), Z 2(n−1)+1, Z 2n, Z 2n+1, Z 2(n+1), Z 2(n+1)+1, Z 2(n+2), - - - in the main scanning direction can be obtained, as shown in FIG. 6. This is a one-dimensional (main scanning direction) signal processing.

The enhanced image data Z, on the other hand, is entered into the floating slice circuit 103 at a predetermined timing. The floating slice circuit 103 performs floating slice processing on the enhanced image data Z using image data for a plurality of (two, for example) picture elements before and behind the enhanced image data Z 2n of the picture element in question to form and output a floating slice level F. The floating slice level F is also entered into the binarization and density conversion circuit 104.

The floating slice circuit 103 performs floating slice processing on the picture element in question X 2n to obtain a slice level (floating slice level) for binarizing the picture element in question X 2n (or the enhanced image data Z 2n thereof). To this end, the floating slice circuit 103 performs a predetermined operation, $F\ 2n = (1-T) \times S + T \times (Zmax\_2n + Zmin\_2n)/2$, to obtain the slice level F 2n. Zmax_2n and Zmin_2n are the maximum and minimum values among the image data, Z 2(n−2), Z 2(n−1), Z 2(n+1), Z 2(n+2), for a plurality of (two, for example) of picture elements before and behind the picture element in question X 2n. This is the processing for obtaining the floating slice level F as a function having four image data before and behind the picture element in question as variables. The coefficient S is a constant that is a slice level determined in advance by the equipment characteristics or specified by the operator. (See FIG. 8B.)

The floating slice circuit 103 uses a coefficient T determined by the characteristics of the equipment or specified by the operator. The coefficient T represents the degree of floating (fluctuation). The larger than "0" the coefficient K is the larger becomes the floating slice effect. Since too large the coefficient T could disrupt gradation performance, the coefficient T is set to an appropriate value in accordance with the characteristics of the equipment, or specified by the operator. By repeating this processing in sequence, a floating slice level F arranged in such a manner as - - - F 2(n−1), F 2(n−1)+1, F 2n, F 2n+1, F 2(n+1), F 2(n+1)+1, F 2(n+2), - - - in the main scanning direction can be obtained, as shown in FIG. 7. This is a one-dimensional (main scanning direction) signal processing.

The binarization and density conversion circuit 104 performs binarization on the enhanced image data Z produced by the enhancement and interpolation circuit 102 using the floating slice level F from the floating slice circuit 103 to produce binarized image data B, and then carries out density control on the binarized image data B using the density control signal generated by the density control signal generating circuit 105 to produce and output density converted image data B. The density converted image data B, which is also binarized image data having a different density, is expressed by symbol B.

The binarization and density conversion circuit 104 comprises a binarizing circuit 130 and a density conversion circuit 131. The binarizing circuit 130 binarizes the enhanced image data produced by the enhancement and interpolation circuit 102 using the floating slice level F from the floating slice circuit 103 to form binarized image data B. The density conversion circuit 131 performs density control on the binarized image data B produced by the binarizing circuit 130 using the density control signal generated by the density control signal generating circuit 105 to produce density converted image data B.

The binarizing circuit 130 carries out binarization on the picture element in question X 2n to convert the enhanced image data thereof, Z 2n, to a binary signal B 2n. To this end, the binarizing circuit 130 slices the enhanced image data Z 2n with the floating slice level F 2n corresponding to that data. The binarizing circuit 130 forms a binary signal of B 2n=1 (that corresponds to black, for example) if Z 2n>F 2n, and a binary signal of B 2n=0 (that corresponds to white, for example) if Z 2n F 2n. By repeating this processing, binarized image data B arranged in such a manner as - - - B 2(n−1) white, B 2(n+1)+1 white, B 2n black, B 2n+1=white, B 2(n+1)=white, B 2(n+1)+1=black, B 2(n+2) black, - - - in the main scanning direction can be obtained, as shown in FIG. 7. Since the processing for obtaining enhanced image data Z 2n and floating slice level F 2n is a one-dimensional (main scanning direction) signal processing, this processing is also a one-dimensional (main scanning direction) signal processing.

The density conversion circuit 131 carries out density conversion processing to convert the density of the binarized image data B produced by the binarizing circuit 130. To this end, the density conversion circuit 131 discards data at a predetermined ratio from the binarized image data B in accordance with the density control signal generated by the density control signal generating circuit 105, and changes the data to be discarded in accordance with the density control signal in predetermined circumstances.

The density control signal generating circuit 105 generates density control signals (ZOOM) in accordance with the density specified by the microprocessor 8. The instruction for density designation is given by the operator by specifying the resolution of an image to be output, for example, as 600 dpi (dots per inch), 300 dpi, etc. If the reading performance (resolution) of the line sensor is 400 dpi, for example, the interpolated image data Y of 800 dpi (twice the original resolution) is produced through the interpolation processing according to the present invention and used to form binarized image data of the same resolution, which is then used to form binarized image data (density converted image data) of the specified reading density (resolution). That is, after image data is binarized with the floating slice level F, the density of the binarized image data is converted. In doing this, the operator need not take the reading performance of the line sensor into consideration.

If the resolution (original image data X) of the line sensor is 400 dpi and the resolution specified by the instruction for density designation is 600 dpi, density control signal is produced as follows. Since interpolated image data Y and binarized image data B have a resolution of 800 dpi, discarding data from the binarized image data B at the ratio of one out of four (extracting three out of four) yields data of a density of 600 dpi. Consequently, density control signal is output in synchronism with the binarized image data B and used as a signal (that is at the HIGH level, for example) to instruct the discarding of binarized image data B at the ratio of one out of four, or as a signal (that is at the LOW level, for example) to instruct the extraction of the remaining binarized image data B as density converted image data B. Binarized image data B 2n and B 2(n+2), for example, are discarded at the ratio of one out of four in accordance with the density control signal, as shown in FIG. 7,. In FIG. 7, discarding data is expressed by character "D," and extracting data by "E."

Discarding the binarized data B 2n, however, would result in a defective image. That is, since the data in question represents an isolated point of black, the black that is to be displayed at that point is lost. The isolated point is represented by the binarized data having a value of "black" that is different from the binarized data of "white" for the two sets of image data before and behind the isolated point.

The density conversion circuit 131 extracts data representing an isolated point of black or white, and if the data at that location is to be discarded, changes the data to be discarded so that the data at other location are discarded. The density conversion circuit 131 leaves the binarized image data B 2n as it is without discarding it, and discards binarized image data B 2n+1 immediately behind the data (or the binarized image data B (2n−1)+1 immediately before the data). By doing this, the image data that is faithful to the original image can be obtained. The binarized image data B 2(n+2) is discarded as it is because it is not the data at an isolated point. By repeating the above processing, the density converted image data B arranged in such a manner as - - - B 2(n−1) white, B 2(n−1)+1=white, B 2(n+1)=white, B 2(n+1)+1=black, - - - in the main scanning direction can be obtained, as shown in FIG. 7.

With the image scanner 100 according to the present invention, the resolution thereof can be made variable within a predetermined range, independently of the reading performance of the line sensor, and can be specified by the operator from the outside of the image scanner 100. The image scanner 100 of the present invention first produces image data having a resolution twice as high, which is used to form image data having a specified reading density. Thus, image data that is faithful to original image, or clear image data can be obtained by absorbing signal deterioration due to quantizing errors during reading. Furthermore, since the data on the white or black isolated points in the original image is left as it is without deletion during density conversion, image data that is faithful to the original image can be obtained even when the resolution of the image scanner 100 is set independently of the performance of the line sensor.

As shown in FIG. 8, characters (test pattern) printed or hand-written on the document 300, "MARS," are read by the image scanner 100 of the present invention. At this time, the original image data X on a read line as shown in FIG. 8A are unclear binary signals that vary under the influence of the surroundings of that picture element, as shown in FIG. 8B. The central part of "M," for example, tends to be read as white due to the loss of what should have been black, while the central part of "A" tends to be read as black because what should have been white has been excessively covered with black. These are typical examples of "holidays" and "overpainting."

The image scanner 100 of the present invention produces an enhanced image data Z by increasing the amplitude of the original image data X, and slightly shifts the slice level in the direction in which the amplitude has been increased to form a floating slice level, as shown in FIG. 8C. By doing this, the "holidays" and "overpainting" of the original image data can be prevented. The use of the floating slice level allows isolated points, such as tips on the central part of character "M," to be precisely binarized as black to obtain the image data faithful to the original image.

Figure 9:
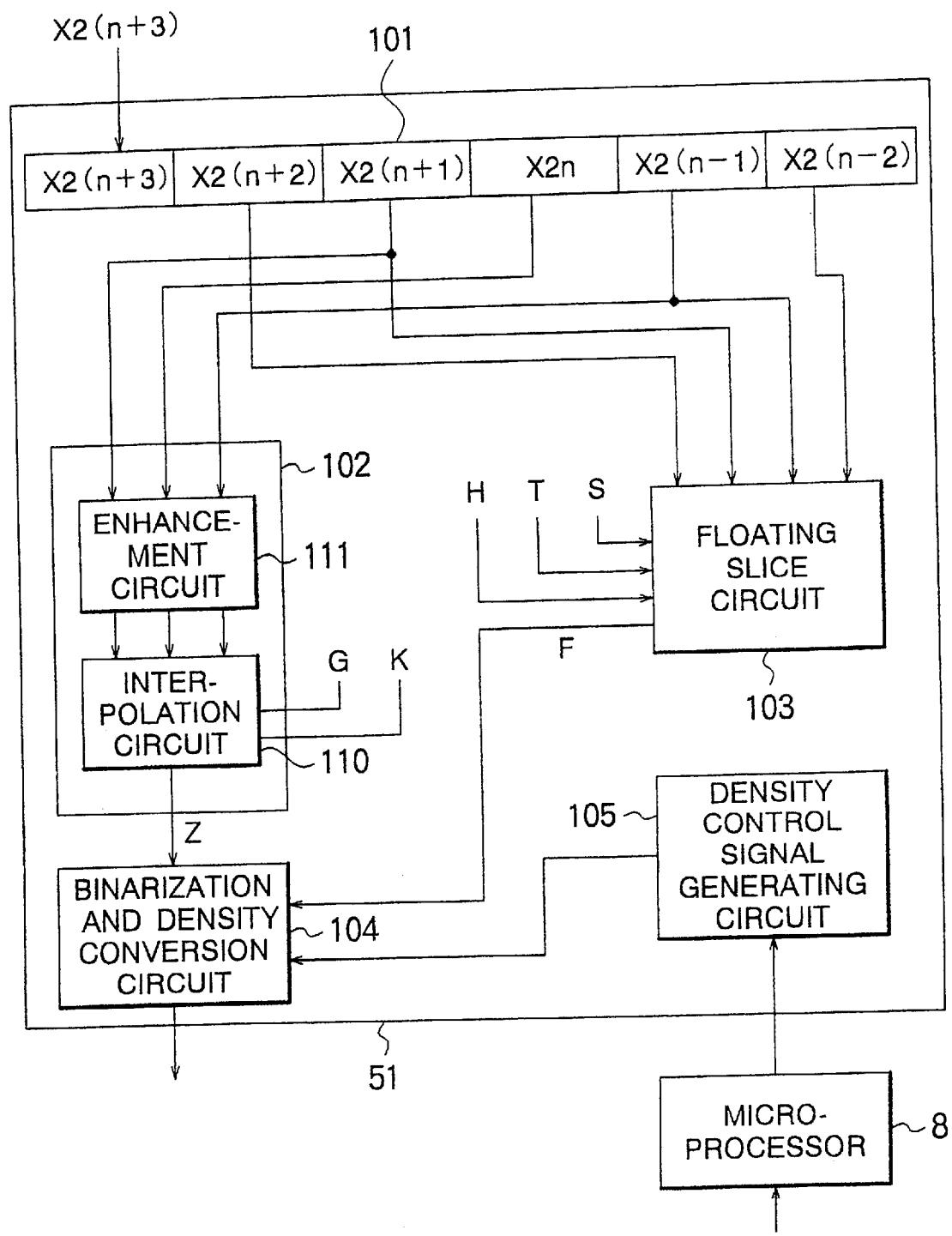
FIG. 9 is a block diagram of a resolution enhancement circuit.

FIG. 9 shows the actual configuration of the resolution enhancement circuit for comparison with FIG. 5. In FIG. 9, the image data (such as the original image data X 2n, etc.) of the picture element X 2n, etc. is entered from the data signal generating circuit 52 into the delay circuit 101. In addition to the picture element in question X 2n, the original image data X 2(n−2), X 2(n−1), X 2(n+1) and X 2(n+2) of the two picture elements each before and behind X 2n is output from the delay circuit 101. At this time, the original image data X 2(n+3) of the second next picture element to the picture element in question X 2n is entered into the delay circuit 101.

The original image data X 2(n−1), X 2n, and X 2(n+1) is entered into the enhancement and interpolation circuit 102. As is apparent from comparing with FIG. 5, the original image data X is actually subjected in advance to image enhancement processing to obtain an enhanced image data. And then, interpolation processing is carried out using the enhance image data to form an interpolated image data. In addition to the coefficient K, a correction coefficient G is used to correct the coefficient K. Consequently, the enhancement and interpolation circuit 102 carries out interpolation processing and enhancement processing on the image data X 2n of the picture element in question using the image data X 2n and the image data X 2(n−1) and X 2(n+1) of the picture elements before and behind X 2n, and predetermined coefficients K and G.

The original image data X 2(n−2), X 2(n−1), X 2(n+1) and X 2(n+2) is entered into the floating slice circuit 103. As is apparent from comparison with FIG. 5, floating slice processing is actually carried out on the original image data X, not on the enhanced image data to form the floating slice level F. In addition to the coefficient T, a correction coefficient H is used to correct the coefficient T. Furthermore, a predetermined coefficient S is also used. Thus, the floating slice circuit 103 carries out floating slice processing on the image data X 2n using the image data for two picture elements before and behind the image data X 2n.

The output of the enhancement and interpolation circuit 102 (hereinafter referred to as Z) and the floating slice level F from the floating slice circuit 103 are entered into the binarization and density conversion circuit 104. As is apparent from comparing with FIG. 5, density conversion processing and binarizing processing are actually carried out simultaneously on the enhanced and interpolated image data Z to produce binarized image data. The floating slice level F and the density control signal are entered into the binarization and density conversion circuit 104. Consequently, the binarization and density conversion circuit 104 carries out density conversion processing and binarization processing on the image data X 2n of the picture element in question using the image data X 2n, the floating slice level F and the density control signal.

Figure 10:
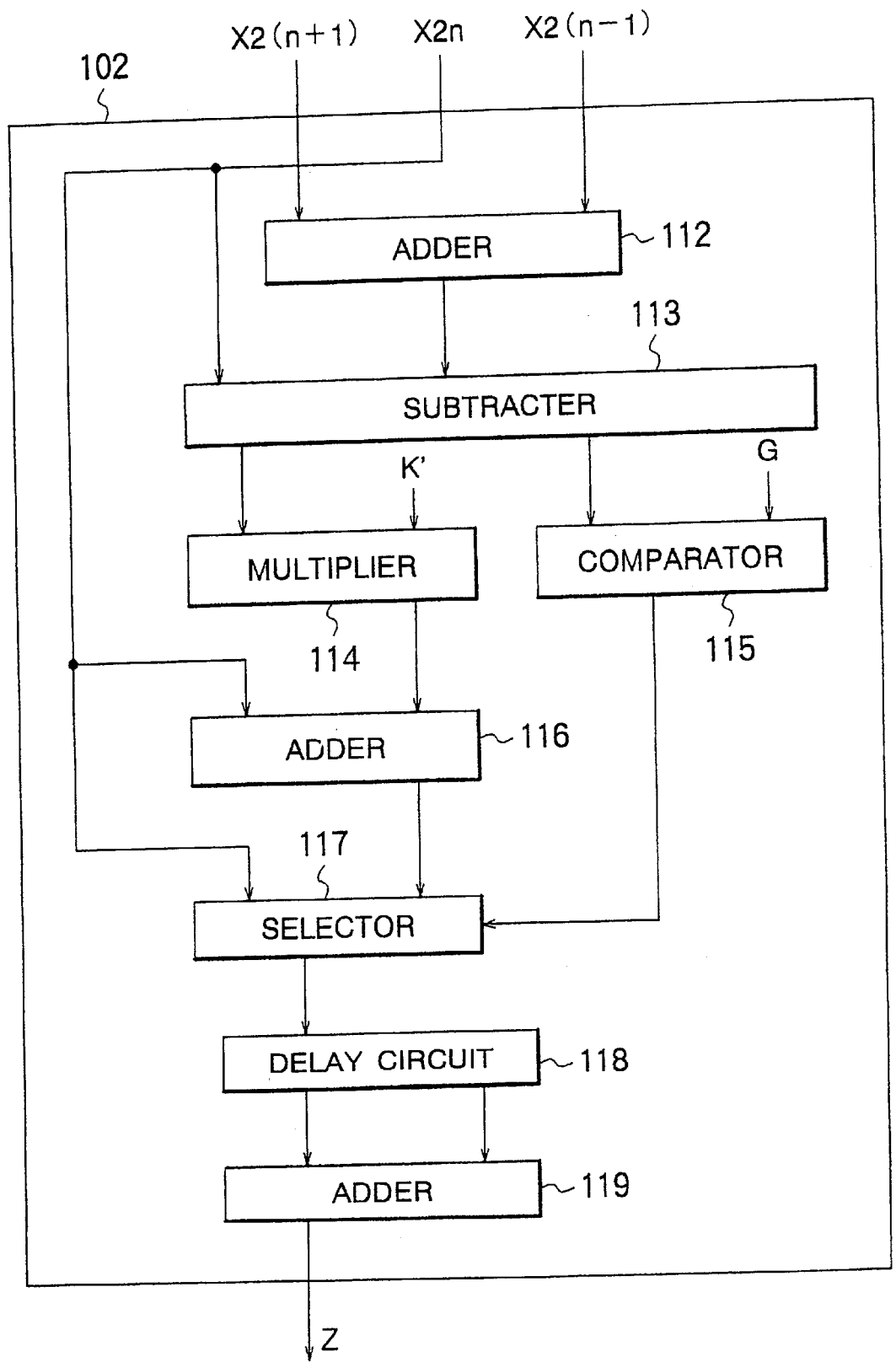
FIG. 10 is a block diagram of an enhancement and interpolation circuit.
Figure 11:
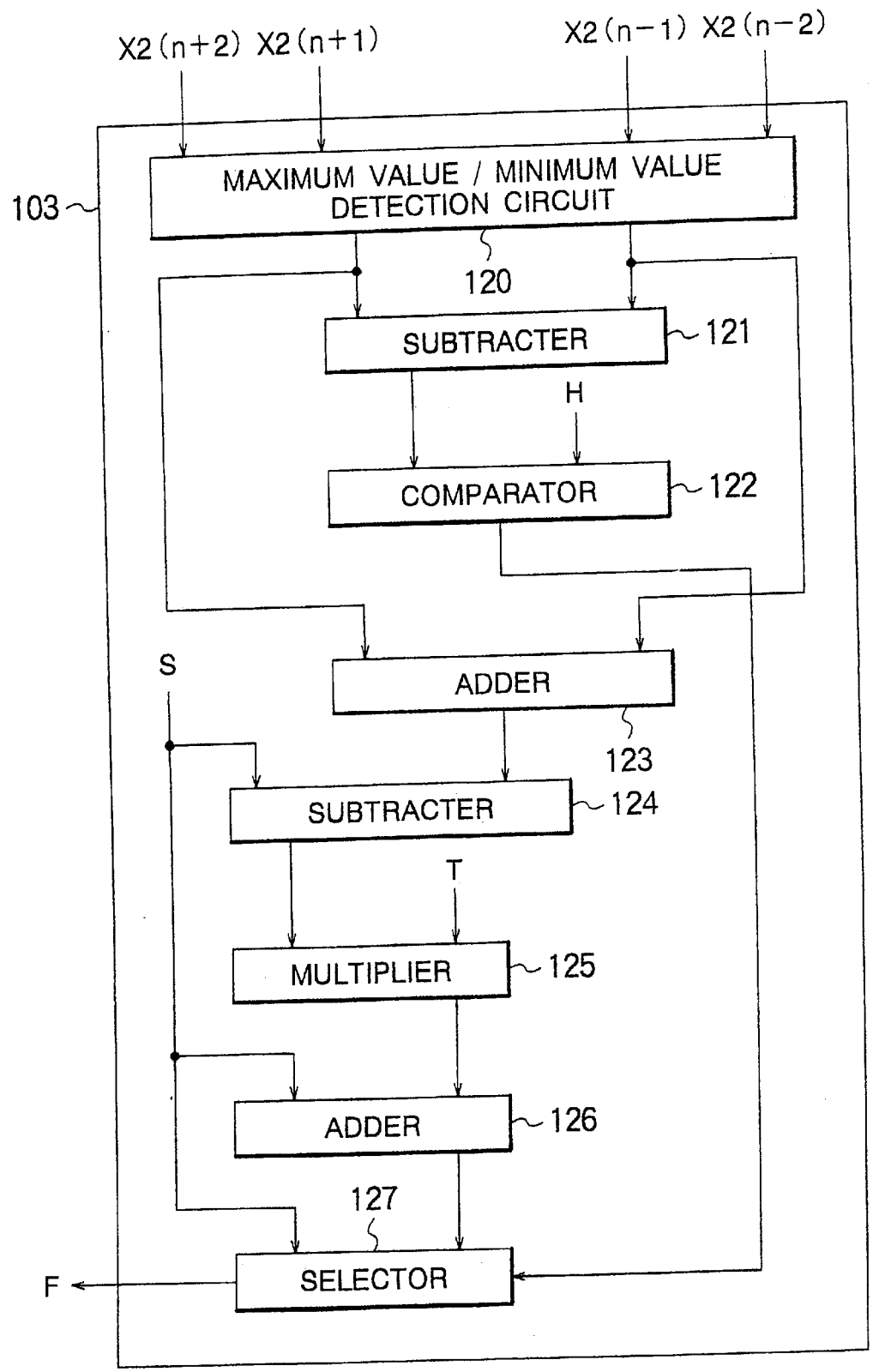
FIG. 11 is a block diagram of a floating slice circuit.
Figure 12:
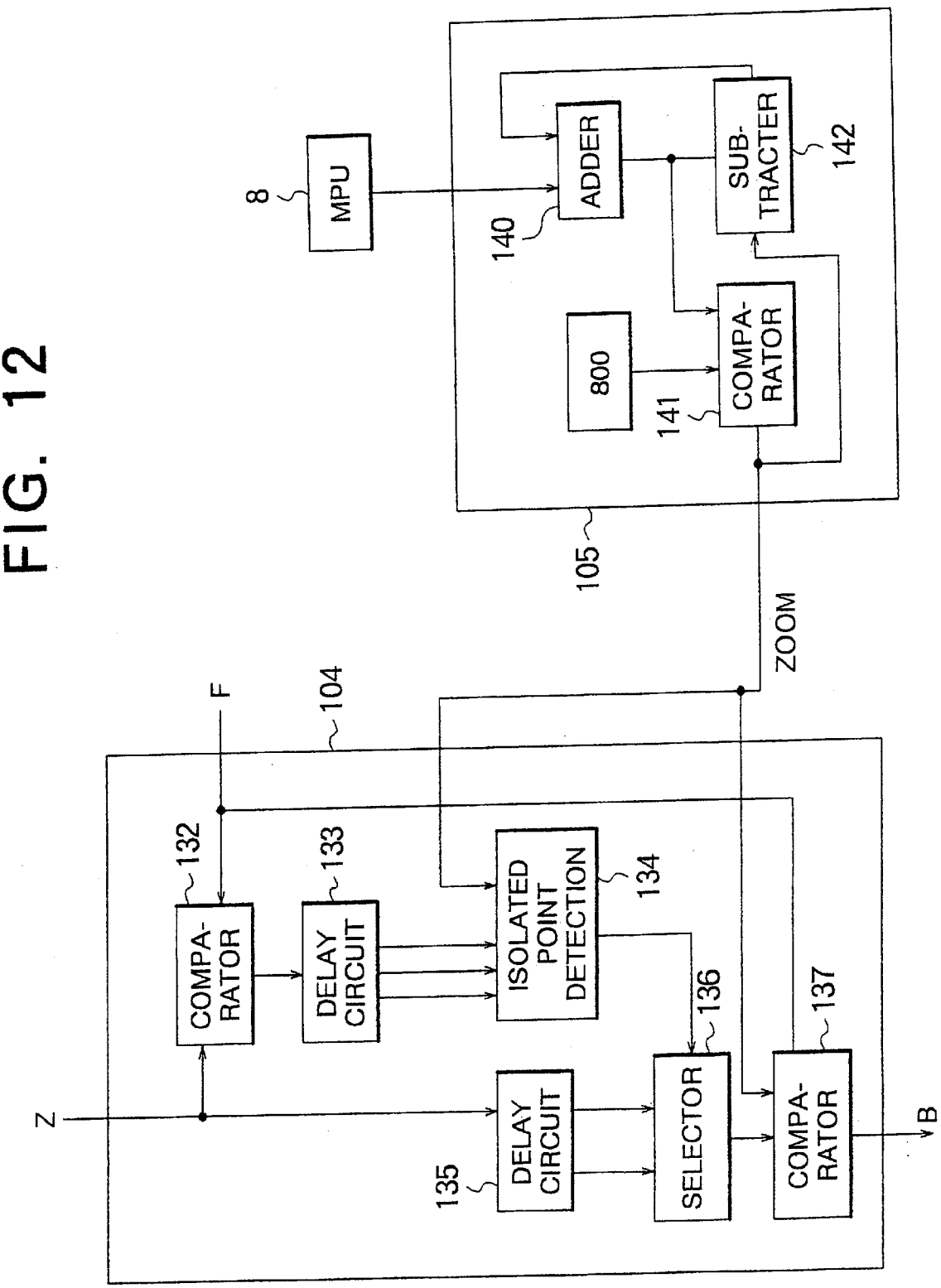
FIG. 12 is a block diagram of a binarization and density conversion circuit.

FIG. 10 shows the configuration of the enhancement and interpolation circuit 102, FIG. 11 shows the configuration of the floating slice circuit 103, and FIG. 12 shows the configuration of the binarization and density conversion circuit 104 and the density control signal generating circuit 105.

As shown in FIG. 10, original image data X 2(n−1) and X 2(n+1) are entered into an adder 112, which in turn generates (X 2(n−1)+X 2(n+1))/2. This value and original image data X 2n are entered into a subtracter 113, which in turn generates X 2n−(X 2(n−1)+X 2(n+1))/2. This value and a coefficient K' are entered into a multiplier 114, which in turn generates K'×(X 2n−(X 2(n−1)+X 2(n+1))/2). This value and the picture element in question X 2n are entered into an adder 116, which in turn generates K'×(X 2n−(X 2(n−1)+X 2(n+1) )/2)+X 2n=K×X 2n+(1−K)×(X 2(n−1)+X 2(n+1))/2. This is enhanced image data Z. This value and the original image data X 2n are entered into a selector 117 where either thereof is selectively output by a comparator 115. In the above discussion, K'=K−1.

The output of the subtracter 113, X 2n−(X 2(n−1)+X 2(n+1))/2, and a coefficient G are entered into the comparator 115 for comparison. If the former value is smaller than the coefficient G, a selection signal that makes the coefficient K value "1" is output. That is, the original image data X 2n is output. In other cases, a selection signal that leaves the coefficient K value as it is output. That is, the output of the adder 116, K×X 2n+(1−K)×(X 2(n−1)+X 2(n+1))/2, is selected. The coefficient G is a value determined by the S/N ratio intrinsic to the image scanner 100, and others. Although the smaller the coefficient G value the more effective minute signal can be detected, useless noises can also be picked up unwantedly. The coefficient G value is determined in accordance with the characteristics of the equipment or by the instruction given by the operator.

The output of the selector 117 is the original image data X 2n if the output of the comparator 115 is a selection signal that makes the coefficient K value "1," and is the enhanced image data Z in other cases. The output of the selector 117 is entered into the delay circuit 118, and output at a timing shifted by a half cycle. Consequently, the original image data X 2n, or the enhanced image data Z of the picture element in question, and the original image data X 2(n+1), or the enhanced image data Z, of the picture element that is one picture element behind X 2n are entered into the adder 119 at a timing shifted by a half cycle, and as a result, the average value of these two sets of data, ((X 2n or Z 2n)+(X 2(n+1) or Z 2(n+1))/2 or (X 2n or Z 2n), is output. This is the enhanced and interpolated image data Z.

In this way, not only the average value of the enhanced signals but also the average value of the original image data X 2n may be output. As interpolation processing is carried out using the aforementioned output, the average value of the original image data X 2n or the enhanced data thereof is used as the enhanced and interpolated image data Z. This is the reason why enhancement processing is performed in advance of interpolation processing. By doing this, clearer image data can be obtained empirically. By adopting such a configuration, the amount of hardware can be reduced.

As shown in FIG. 11, the original image data, X 2(n−2), X 2(n−1), X 2(n+1), X 2(n+2), are entered into the maximum value/minimum value detection circuit 120. The maximum value (Xmax_2n) and the minimum value (Xmin_2n) among the four original image data detected by the maximum value/minimum value detection circuit 120 are entered into the subtracter 121 and the adder 123.

The value (maximum value−minimum value)=X max_2NXmin_2n output by the subtracter 121, and a coefficient H are entered into the comparator 122 for comparison. If the former value is smaller than the coefficient H, a selection signal that makes a coefficient T, which will be described later, "0" is output. That is, a coefficient S is selected. In other cases, a selection signal that leaves the coefficient T as it is output. That is, (1−T)×S +T×(Xmax_2n+Xmin_2n)/2 is selected. The coefficient H is used to identify effective image information. Although the smaller the coefficient H value the more effective minute signal can be detected, useless noises may also be detected. The coefficient H value is determined in accordance with the characteristics of the equipment or the instruction given by the operator.

The value (maximum value+minimum value)/2=(Xmas_2n+Xmin_2n)/2 output by the adder 123 is entered into the subtracter 124, and the difference between this value and the coefficient S is output. This difference (Xmax_2n+Xmin_2n)/2−S, and the coefficient T are entered into the multiplier 125, which in turn generates T×((Xmax_2n+Xmin_2n)/2−S) is output. This output and the coefficient S are entered into the adder 126, which in turn generates S+T×((Xmax_2n+Xmin_2n)/2−S)=(1−T)×S +T×(Xmax_2n+Xmin_2n)/2. This is a floating slice F. This output and the coefficient S are entered into the selector 127.

The output of the selector 127 is a fixed slice level S if the output of the comparator 122 is a selection signal that makes the coefficient T value "0," and it is the floating slice F in other cases. In this way, not only the slice signal that has been subjected to floating processing as the floating slice F but also the fixed slice level S may be output as it is. By carrying out slice processing using the aforementioned output, clearer image data can be obtained empirically. With this configuration, the amount of hardware can be reduced.

In FIG. 12, the density designation control signal from the microprocessor 8 is entered into the adder 140 of the density control signal generating circuit 105. When the resolution of the line sensor is 400 dpi, and the resolution of the density designation instruction is 600 dpi, for example, data are discarded at the ratio of one out of four (in other words, data are collected at the ratio of 600 out of 800) from the enhanced and interpolated image data Z, a density of 600 dpi can be realized, as described above. Thus, the value as density designation is set to "600."

The output of the subtracter 142 is entered into the adder 140. This is the subtracted value of "−0" or "−180" that is output in synchronism with the enhanced and interpolated image data Z of (800 dpi). The adder 140 generates an added value at that timing. The aforementioned added value output is entered into the comparator 141 and the subtracter 142. The subtracter 142 generates a value obtained by subtracting "800" or "0" from the value of the adder 140, as instructed by the output (ZOOM) of the comparator 141. If ZOOM is at the HIGH level, for example, a value obtained by subtracting "800" from the value of the adder 140 is output.

The comparator 141 compares the added value of the adder 140 with "800" as a value being compared. If the added value is less than 800, the comparator 141 generates a density control signal (ZOOM) (of a low level, for example) that instructs discarding. In other cases, the comparator 141 generate a density control signal (of a high level, for example) that instructs the output as it is, that is, to extract the data as it is. The aforementioned density control signal is entered into the binarization and density conversion circuit 104 and the subtracter 142.

If the density control signal instructs discarding, the subtracter 142 generates the contents it holds. In other cases, the subtracter 142 generates (the contents it holds—800).

With the above configuration, the density control signal is used as an output (of a high level, for example) for instructing extraction at the ratio of 600 out of 800, for example, in synchronism with the enhanced and interpolated image data Z of 800 dpi, and this process is repeated. If the resolution of the density designation instruction is 800 dpi, the comparator 141 generates only the signal (of a high level, for example) to instruct data extraction because there is no need for discarding data.

The enhanced and interpolated image data Z from the enhancement and interpolation circuit 102 and the floating slice F from the floating slice circuit 103 are entered into the comparator 132 for comparison. The output from the comparator 132 is "black" (or 1) if the enhanced and interpolated image data Z is larger than the floating slice F, and "white" (or 0) in other cases. That is, binarized image data B (or data equal to it) is output and entered into the delay circuit 133. The delay circuit 133 generates the binarized image data B of the picture element in question and the binarized image data B each of one picture element before and behind the picture element in question at a predetermined timing. These outputs and the density control signal (ZOOM) from the density control signal generating circuit 519 are entered into the isolated point detection circuit 134. The isolated point detection circuit 134, when the density control signal is a signal to instruct discarding, generates a signal to compare three sets of entered binarized image data B to detect and indicate whether the picture element in question is an isolated point. In other cases, the isolated point detection circuit 134 generates a signal to indicate that the picture element in question is not an isolated point without detecting isolated points. For the binarized image data B 2n in FIG. 7, for example, a signal to indicate that it is an isolated point is generated, and for the binarized image data B 2(n+2), a signal to indicate that it is not an isolated point is generated. These output are entered into the selector 136.

The enhanced and interpolated image data Z from the enhancement and interpolation circuit 102 is entered into the delay circuit 135. The delay circuit 135 generates the enhanced and interpolated image data Z of the picture element in question and the enhanced and interpolated image data Z of one picture element behind the picture element in question at a predetermined timing. These outputs are entered into the selector 136. In the case of a signal to indicate that the output of the isolated point detection circuit 134 is not an isolated point, the selector 136 generates the enhanced and interpolated image data Z of the picture element in question and that of one picture element behind the picture element in question in that order. In the case of a signal to indicate the output of the isolated point detection circuit 134 is an isolated point, the selector 136 generates the enhanced and interpolated image data Z of the picture element in question and that of one picture element behind the picture element in question by reversing the order. The binarized image data B 2n in FIG. 7, for example, is output after replaced with the binarized image data B 2n+1 of one picture element behind it, while the binarized image data B 2(n+2) is output in that order without being replaced with the binarized image data of one picture element behind the picture element in question.

The enhanced and interpolated image data Z from the selector 136, the floating slice F from the floating slice circuit 103, and the density control signal from the density control signal generating circuit 519 are entered into the comparator 137. When the density control signal is a signal for instructing discarding, the comparator 137 does not generate the corresponding binarized image data without performing processing for comparing the floating slice F. In other cases, the comparator 137 performs binarization processing by comparing the enhanced and interpolated image data Z with the floating slice F. The output of the comparator 137 at this time is "black" when the enhanced and interpolated image data Z is larger than the floating slice F, while it is "white" in other cases. That is, binarized image data B is output. The aforementioned output is entered into the delay circuit (not shown) and is output after adjusted the output timing.

The binarized image data B 2n, for example, is output after replaced with binarized image data B 2n+1 immediately after it. This is because the binarized image data B 2n is an isolated point, and because the binarized image data B 2n is present at a point where the density control signal instructs to discard. As a result of replacement in the selector 136, the binarized image data B 2n+1 (which are located at the location of B 2n after replacement) are discarded, while the binarized image data B 2n which is an isolated point (located at the location of B 2n+1 after replacement) is output as density converted image data B without being discarded, as shown in FIG. 7. In FIG. 7, the binarized image data B 2n is expressed as "D-E" (D stands for "discard," E for "extract.")

The binarized image data B 2(n+2), on the other hand, is output in that order without being replaced with binarized image data immediately behind it. This is because the binarized image data B 2(n+2) is not an isolated point. Even when the binarized image data B is present at a location where the density control signal instructs for discarding, the data B is output as it is without being replaced. Consequently, the binarized image data B 2(n+1) is discarded. But the density converted image data B 2(n+1)+1 is output as "black," as shown in FIG. 7, because this data is not an isolated point. As a result, the black image that is originally to be present can be displayed without being lost through density conversion and interpolation processing.

(Embodiment 2)

Figure 13:
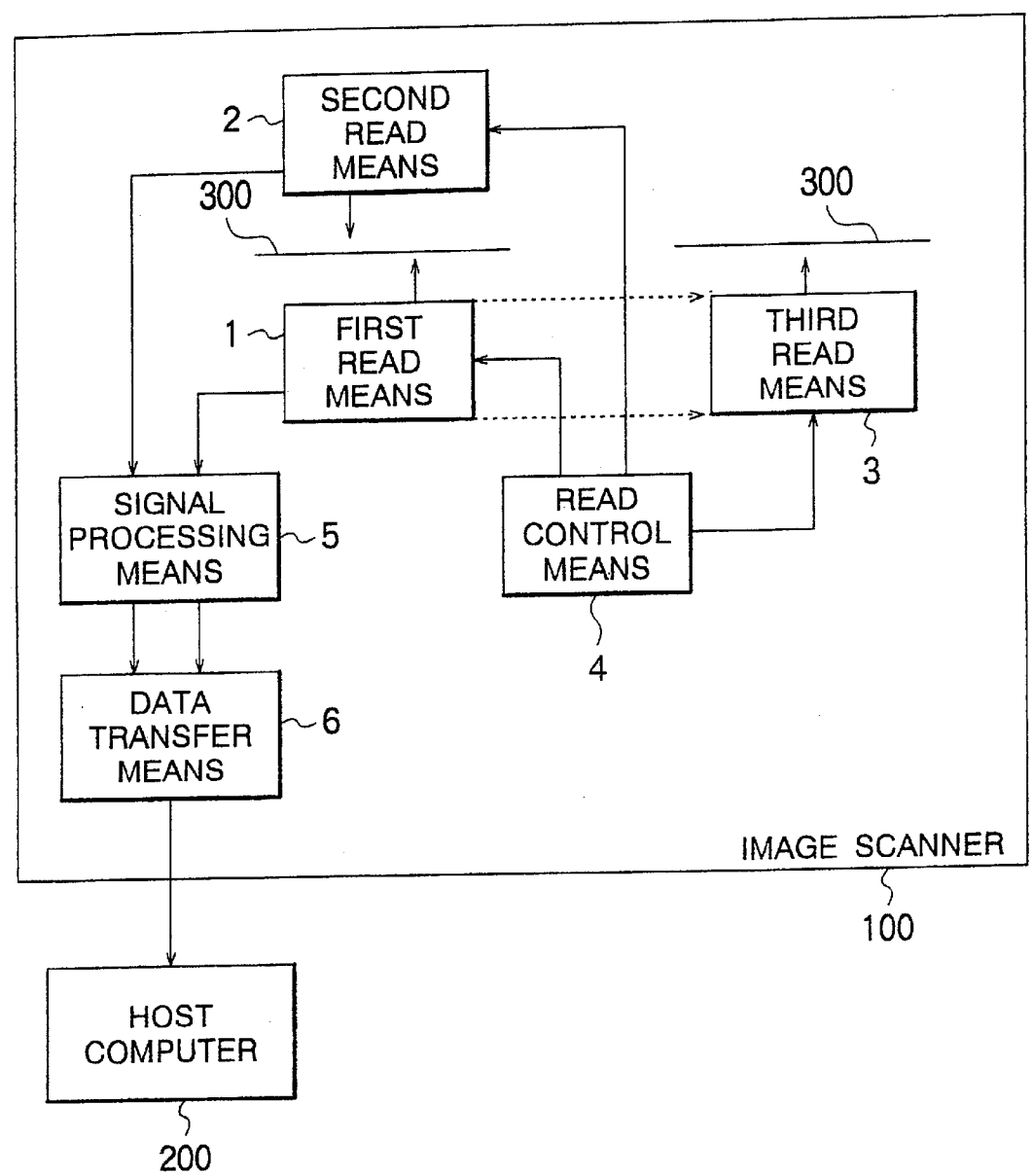
FIG. 13 is a block diagram illustrating the operating principle of a second embodiment of the present invention.

FIG. 13 shows the block diagram illustrating the operating principle of the image scanner 100 as a second embodiment of the present invention. The image scanner 100 is connected to the host computer 200 to implement data transfer with it in accordance with a predetermined interface.

The image scanner 100 comprises first read means 1 for double-side read mode for reading image data on the right side of the document 300, second read means 2 for double-side read mode for reading image data on the reverse side of the document 300, third read means 3 for one-side read mode for reading image data on the right side of the document 300 at a different location, read control means 4 for controlling the third read means 3 so as to read image data on the right side of the document 300, signal processing means 5 for producing image data on the right and reverse sides of the document 300 by subjecting the image data read by the first through third read means 1 through 3 to predetermined operations, and data transfer means 6 for transferring the image data on the right and reverse sides of the document 300 formed by the signal processing means 5 to the host computer 200.

In the double-side read mode, the first and second read means 1 and 2 simultaneously read image data on the right and reverse sides of the document 300 under the control of the read control means 4, and the data transfer means 6 transfers the image data for the right and reverse sides of the document 300 at a first data transfer rate (high speed) in accordance with a predetermined interface. In the one-side read mode, the third read means 3 read image data on the right side of the document 300 under the control of the read control means 4, and the data transfer means 6 transfers the image data for the right side of the document 300 at a second data transfer rate (the speed dependent on the drive frequency of CCD, the conventional speed, for example) that is slower than the first data transfer rate in accordance with a predetermined interface.

With the image scanner 100 of the present invention, image data on the right and reverse sides of the document 300 can be read simultaneously in the double-side read mode using the first and second read means 1 and 2. That is, the image scanner 100 of the present invention is a double-side scanner. When entering image data on a business document on the right and reverse sides of which characters and other data (image data) are printed (double-side manuscript), the image scanner 100 of the present invention can read image data with substantially one reading operation. This permits image data to be produced and entered at higher speed without the intervention of an operator even when the document 300 has a manuscript on both side.

The image scanner 100 of the present invention can transfer data in accordance with a predetermined interface both in the double-side read mode and the one-side read mode. By adopting an interface of the same type as the conventional one, the image scanner 100 of the present invention can have interchangeability with the connecting interface for the conventional image scanners. This allows the image scanner of the present invention to be connected to a host computer 200 having an interface corresponding to the conventional image scanner (one-side scanner) without changing the interface (without changing the operating environment of the one-side scanner).

Furthermore, the image scanner 100 of the present invention can increase (substantially double, for example) the data transfer rate in the double-side read mode, compared with the data transfer rate in the one-side read mode, while following a predetermined interface. The transfer time of image data in the double-side read mode involving the amount of data per unit time twice as much as that in the one-side read mode can be made equal to the transfer time of image data in the one-side read mode. Thus, the throughput of business documents, etc. per unit time in the host computer 200 can be almost doubled.

As described earlier, referring to FIG. 2, the optical unit for reading the right side 10 is at the location shown in FIG. 2 in the double-side read mode, and used as a main component of the first read means 1. In the one-side read mode, the optical unit for reading the right side 10 is caused to move in the direction shown by an arrow in FIG. 2, and used as a main component of the third read means 3. As noted earlier, the first read means 1 is one and the same with the third read means 3, and used for different modes by shifting its location. In double-side read mode, the travel speed of the document 300 is set to a predetermined speed. The aforementioned speed is determined, depending on the drive frequency of the line sensor.

FIG. 14 is a block diagram illustrating the configuration of the image scanner 100. The microprocessor 8 controls the data transfer rate in the data transfer means 6 at a specified value in accordance with a predetermined instruction given by the operator from the outside of the image scanner 100. The (first) data transfer rate in the double-side read mode is set by the operator to a value about twice as high as the (second) data transfer rate in the one-side read mode. The first and second data transfer rates can be made variable within a predetermined range. The aforementioned range is determined, dependent on the hardware provided in the data transfer means 6 and the host computer 200.

As noted earlier, referring to FIG. 4, in the first and second read means 1 and 2, the line sensor 11 generates an image signal (analog signal) corresponding to image data on the document 300. The output of the line sensor 11 is amplified in the amplifier 12 to a predetermined level, and converted to a digital signal in the analog/digital converter 13. To implement the optimum AD conversion, signal level modifying processing is carried out using the white level value, which will be described, and a known black level value.

The read control means 4 comprises a sensor control 41, a motor control 42, a frequency voltage converter 43, a motor driver 44, and a motor 45 (and a belt 46 shown in FIG. 2). As described earlier, referring to FIG. 4, the sensor control 41 generates control signals necessary for controlling the line sensor 11, the amplifier 12 and the analog/digital converter 13 of the first and second read means 1 and 2, and controls them. The motor control 42 generates control signals necessary for controlling the motor 45, and supplies them to the frequency voltage converter 43 and the motor driver 44 to control the motor 45, such as the motor of the ADF system, and the motor for driving the first read means 1, etc.

Figure 15:
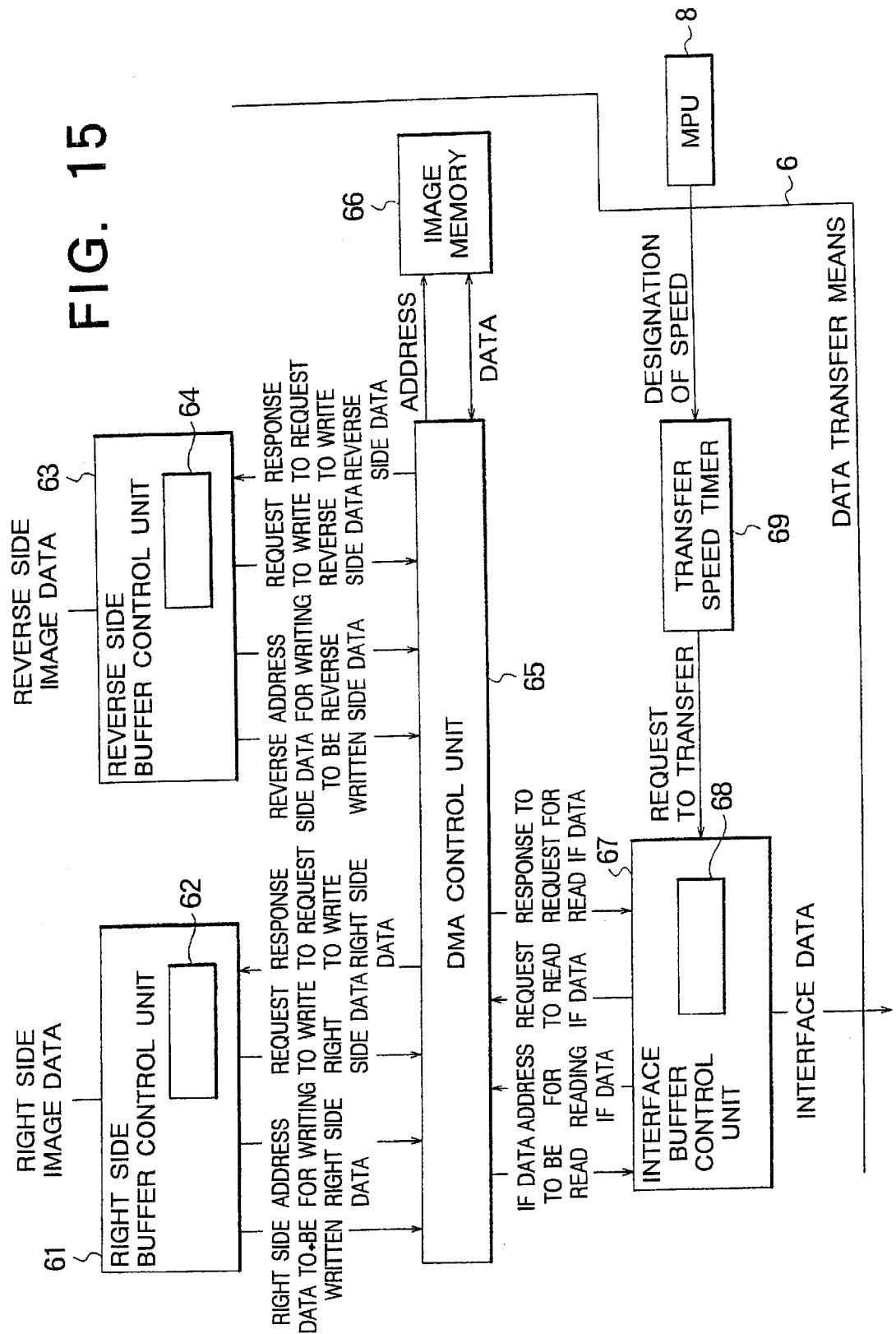
FIG. 15 is a block diagram of an image scanner.

FIG. 15 is a block diagram illustrating the configuration of the data transfer means 6 of the image scanner 100. In FIG. 15, the data transfer means 6 comprises a right-side buffer control 61, a reverse-side buffer control 63, a DMA control 65, an image memory 66, an interface buffer control 67, and a transfer rate timer 69. The right-side buffer control 61, the reverse-side buffer control 63, and the interface buffer control 67 each have a right-side write buffer register 62, a reverse-side write buffer register 64, and a read buffer register 68.

The right-side buffer control 61 temporarily stores the image data of the right side of the document 300 (right-side image data), as part of the optimum image data entered by the signal processing means 5, into the right-side write buffer register 62 thereof (buffering). The reverse-side buffer control 63 temporarily stores the image data of the reverse side of the document 300 (reverse-side image data), as part of the optimum image data, into the reverse-side write buffer register 64 thereof. The right-side write buffer register 62 and the reverse-side write buffer register 64 comprise a write buffer register. The right-side image data and the reverse-side image data comprise 8-bit parallel data. That is, 8-bit image data for one picture element, or 8-bit image data extracted bit by bit from 8 picture elements are entered byte by byte from the signal processing means 5.

The right-side buffer control 61, after storing the right-side image data into the right-side write buffer register 62, sends a request to write the right-side image data into the image memory 66 (request to write right-side) to the DMA control 65. In response to this, the DMA control 65 sends (returns) a right-side image data write enable (response to request to write right-side) to the right-side buffer control 61. Upon receipt of the response to request to write right-side, the right-side buffer control 61 generates an address signal to write (address for writing right-side), and sends it to the DMA control 65, together with the right-side image data to be written (right-side data to be written). Since the aforementioned data transfer is DMA (direct memory access) transfer, the microprocessor 8 is not involved in this data transfer.

The reverse-side buffer control 63 performs similar processing to that of the right-side buffer control 61. The reverse-side buffer control 63, after storing the reverse-side image data into the reverse-side write buffer register 64, sends a request to write it to the image memory 66 (request to write reverse-side) to the DMA control 65. In response to this, the DMA control 65 returns a reverse-side image data write enable (response to request to write reverse side) to the reverse-side buffer control 63. Upon receipt of it, the reverse-side buffer control 63 generates an address signal to write the reverse-side image data (address for writing reverse-side), and sends it to the DMA control 65, together with the reverse-side image data to be written (reverse-side data to be written).

The address for writing the right side and the address for writing the reverse side are each considered as a 26-bit signal, for example. The right-side write data and the reverse-side write data are each considered to be 32 bits, for example. That is, data transfer between the right-side buffer control 61 and the reverse-side buffer control 63, and the DMA control 65 is carried out in one operation for image data (image data block) for four picture elements. These values are dependent on the configuration of the image memory 66.

The DMA control 65, upon receipt of the address for writing the right side and the right-side write data from the right-side buffer control 61, writes the right-side write data into the address for writing the right side of the image memory 66. Similarly, the DMA control 65, upon receipt of the address for writing the reverse side and the reverse-side write data from the reverse-side buffer control 63, writes the reverse-side write data into the address for writing the reverse side of the image memory 66.

The interface buffer control 67 sends a request to read the image data stored in the image memory 66 (request to read IF data) to the DMA control 65 at a predetermined timing. In response to the request, the DMA control 65 returns an image data read enable (response to request to read IF data) to the interface buffer control 67. Upon receipt of the response to request to read IF data, the interface buffer control 67 generates an address signal to read the IF data (address for reading IF data) and sends it to the DMA control 65. Upon receipt of the address for reading IF data, the DMA control 65 reads the image data stored in the address for reading IF data of the image memory 66 (IF data to be read), and transfers the data to the interface buffer control 67. Since the aforementioned data transfer is a DMA transfer, the microprocessor 8 is not involved in this data transfer.

The address for reading the IF data is considered as a 26-bit signal, for example. The IF data to be read is considered to be 32 bits, for example. That is data transfer between the interface buffer control 67 and the DMA control 65 is carried out in one operation for image data for four picture elements, as in the case of data transfer between the right-side buffer control 61 and the reverse-side buffer control 63, and the DMA control 65.

The state of writing and reading image data in the image memory 66, as noted earlier, is shown in FIG. 16. The aforementioned writing/reading operations are arbitration-controlled by the DMA control 65 to avoid collisions. The image memory 66 is halved arbitrarily; the first half 190 and the second half 191 being used to write/read the right-side data to be written and the reverse-side data to be written, respectively.

In the ADF mode, as the first sheet of the document 300 is fed, the writing of the right-side data to be written is started in sequence from the head of the first half 190 of the image memory 66. As shown in FIG. 16A, at a certain point of time when the writing of the right-side data to be written proceeds to a predetermined location of the first half 190 of the image memory 66, the writing of the reverse-side data to be written is started in sequence from the head of the second half 191. At the same time, the reading of the written right-side data is started in sequence from the head of the first half 190. Note that the reading of the written right-side data is performed following the writing processing of the right-side data, while confirming the completion of the writing using the address for writing right-side data. The same applies to the following description.

Next, as shown in FIG. 16B, the writing of the right-side data to be written is completed at the tail end of the first half 190, the reading of the written right-side data proceeds to a predetermined location of the first half 190, and the writing of the reverse-side data to be written proceeds to a predetermined location of the second half 191.

Next, upon completion of the reading of the first sheet of the document 300, the second sheet of the document 300 is fed. The writing of the right-side data to be written is then started in sequence from the head of the first half 190, as shown in FIG. 16C. At this time, the writing of the reverse-side data to be written proceeds to a predetermined location of the second half 191, the reading of the written reverse-side data is started in sequence from the head of the second half 191.

Next, as shown in FIG. 16C, the writing of the right-side data to be written proceeds to a predetermined location of the first half 190, the writing of the reverse-side data to be written is completed at the tail end of the second half 191, and the reading of the written reverse-side data proceeds to a predetermined location of the second half 191.

In this way, with the image memory 66 halved, the writing of image data on the right and reverse sides of a document is executed in parallel, while the reading of the right and reverse sides of the document is executed in a predetermined sequence, independently of the aforementioned writing operations. This allows the image memory 66 to be shared by the right and reverse sides of the document, leading to improved resources efficiency. By combining this with DMA transfer per a plurality of bytes (4 bytes), the availability (access frequency) of the image memory 66 can also be improved. DMA transfer per a plurality of bytes and the use of buffer registers (62, 64 and 68) on the first and second stages (which will be described later) of the image memory 66 helps improve the availability of the image memory 66 and resources efficiency, making it possible to set the transfer rate of image data, independently of the image data reading rate of the line sensor 11, etc. That is, image data transfer rate is made variable.

According to the present invention, it is possible to independently set the data transfer clock (that is, data transfer rate) of the conventional image scanner that has been fixed to 6/8 MHz (one byte per 8 picture elements), for example, based on the drive frequency, etc. (6 MHz, for example) of the line sensor, etc. Hardware comprising the data transfer means 6 and the host computer 200 is clocked at a frequency well above 6/8 MHz. Consequently, the upper limit of the data transfer rate of the image scanner according to the present invention is not dependent on the drive frequency of the line sensor, etc., but is determined by the hardware. The image scanner 100 of the present invention is capable of transferring at high speed (12/8 MHz, twice as high as the conventional rate, for example) the same amount of image data obtained in the double-side read mode at 12 MHz, a speed twice as high as the drive frequency of the line sensor, etc.

Buffer means (62 and 64) of the first stage of the image memory 66 have a buffering function to absorb the difference between the image data reading rate by the first through third read means 1 through 3 and the access rate of the image memory 66, and make it possible to set these rates independently of each other. Buffer means (68) of the second stage of the image memory 66, which will be described later, has a buffering function to absorb the difference between the access rate of the image memory and data transfer rate, and makes it possible to set independently of each other. The aforementioned buffer means of the first stage contributes to increasing image data reading rate and data processing rate mainly by accessing it by a plurality of bytes. The access to this memory is performed with the highest priority. The aforementioned buffer means of the second stage contributes to increasing data transfer rate while preventing data transfer on the interface from being affected by the access to the image memory 66 mainly by accessing it by a plurality of bytes.

In the one-side read mode, the writing/reading of image data is carried out, as in the above case, using only (the buffer register 62 and) the first half 190 of the image memory 66. In this case, too, the transfer rate of image data is made variable, and data transfer rate can be increased.

The interface buffer control 67 temporarily stores the image data block (IF data to be read) transferred from the DMA control 65 into the read buffer register 68. After that, the interface buffer control 67 reads the IF data being read that is stored in the read buffer register 68 in sequence from the head in synchronism with the request to transfer signal sent by the transfer rate timer 69 at a predetermined timing, and transfers it as the interface data to the host computer 200.

The interface data comprises 8-bit parallel data for one or eight picture element, for example. The interface buffer control 67 reads and temporarily stores the 32-bit image data blocks read from the image memory 66 into the buffer register 68, sends them to the interface by 8 bits in sequence from the head, and transfers them to the host computer 200. The reading of the image data from the image memory 66 is the prior reading (prefetch) of the image data to be transferred.

The transfer rate timer 69 generates a request to transfer signal based on the data transfer rate specified by the microprocessor in accordance with a predetermined instruction given by the operator from the outside of the image scanner 100, as noted earlier. The request to transfer signal is generated by a known clock generating circuit (not shown) provided in the transfer rate timer 69, for example, in accordance with the rate specified by the microprocessor 8. The request to transfer signal may be formed by frequency dividing the system clock in a known frequency division circuit, for example.

In the one-side read mode, for example, a request to transfer signal of the frequency of 6/8 MHz is generated in accordance with the operator's rate specification of 6/8 MHz. By specifying in such a manner, the image scanner 100 of the present invention can be connected to the host computer 200 with no changes (not only the interface) in the one-side read mode. In the double-side read mode, a request to transfer signal of the frequency of 12/8 MHz is generated in accordance with the operator's rate specification of 12/8 MHz. This allows the first data transfer rate to be set without changes in interface so that the document can be continuously fed by the document feeding means.

The interface buffer control 67 transfers image data in accordance with a predetermined interface shown in FIG. 17. FIG. 17A shows data transfer in the double-side read mode, while FIG. 17B shows data transfer in the one-side read mode.

As is apparent from FIGS. 17A and 17B, the aforementioned image data connecting (transfer) interface is common to both the double-side read mode and the one-side read mode. As shown in FIGS. 17A and 17B, the interface comprises a vertical effective signal (V gate signal), horizontal effective signal (H gate signal), data transfer clock (V clock) and a data signal to be sent (V data). Consequently, the image scanner 100 also sends the data transfer clock to the host computer 200. The data transfer clock is substantially equal to a request to transfer signal.

The vertical effective signal represents a page break. When the vertical effective signal is at the HIGH level (ON or 1), for example, image data for a given page is sent during that period, and when the vertical effective signal is at the LOW level (OFF or 0), the signal represents a page break. The horizontal effective signal represents a line break. If the horizontal effective signal is at the HIGH level, image data for a given line is sent during that period, and if the horizontal effective signal is at the LOW level, the signal represents a line break. During the period when the vertical effective signal is at the HIGH level, a predetermined number (equal to the number of lines in a page) of horizontal effective signals of the HIGH level are included. During the period when horizontal effective signals are at the HIGH level, a predetermined number (equal to the number of picture elements in a line) of data signals are included. Data signals here are 8-bit parallel signals for one or eight picture elements.

Data signals are transferred in synchronism with the data transfer clock. The number of horizontal effective signals included during the period when vertical effective signals are at the HIGH level, and the number of data transfer clocks during the period when the horizontal effective signals are at the HIGH level are determined in advance. The periods when vertical effective signals and horizontal effective signals are at the HIGH level are determined by the data transfer rate (frequency of request to transfer signals) specified by the operator via the microprocessor 8.

For example, a 12/8-MHz data transfer clock is formed in the double-side read mode in accordance with the rate of 12/8 MHz specified by the operator, as shown in FIG. 17A. In the one-side read mode, a 6/8-MHz data transfer clock is formed in accordance with the rate of 6/8 MHz specified by the operator, as shown in FIG. 17B. As is apparent from a comparison between FIGS. 17A and 17B, the period in which vertical effective signals and horizontal effective signals are at the HIGH level in the double-side read mode is ½ the period in which vertical effective signals and horizontal effective signals are at the HIGH level in the one-side read mode. As a result, in the double-side read mode, image data/unit time twice as much can be transferred to the host computer 200 in the same transfer time as the conventional practice. In the double-side read mode, therefore, the first data transfer rate can be set without changing the interface so that the document can be supplied continuously by the document feeding means.

Figure 18:
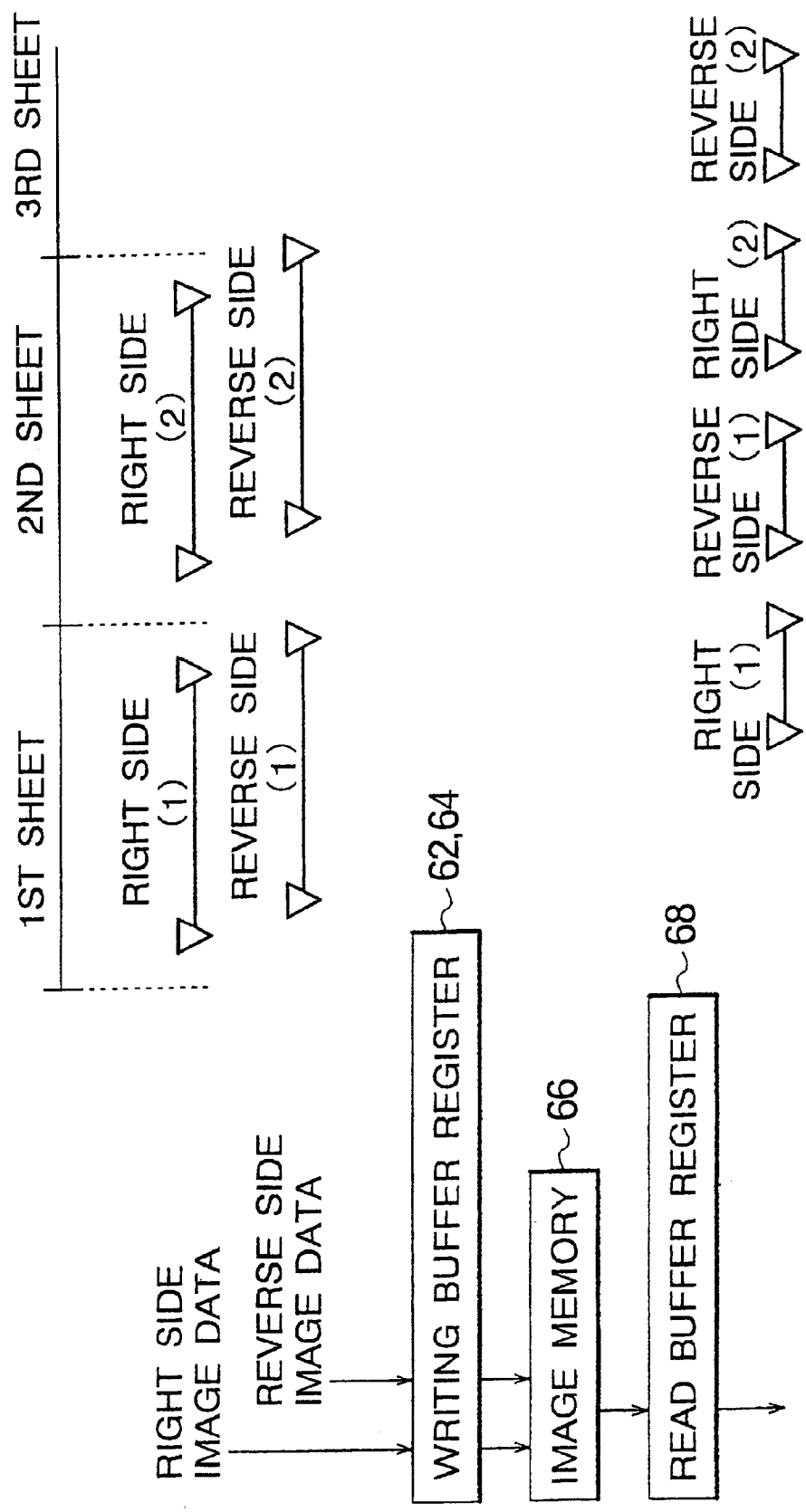
FIG. 18 is a diagram of assistance in explaining data transfer.

FIG. 18 shows the data transfer timing of image data. As shown in FIG. 18, as the feeding of the first sheet of the document 300 is started, image data of the right side of the first sheet of the document 300 (right-side ) can be obtained at a timing lagging a predetermined time behind the start. Image data on the reverse side of the first sheet of the document 300 (reverse-side ) can be obtained at a timing lagging a predetermined time behind the start of formation of the right-side image data. The feeding of the first sheet of the document 300 is completed (discharge is completed) at a timing after the completion of formation of the reverse-side image data. As the feeding of the second sheet of the document 300 is started, right-side and reverse-side image data can be obtained at a timing similar to that for the first sheet.

As described above, the time required to obtain right-side through reverse-side image data is the same. That is, image data for four pages can be obtained in the time required from the start of feeding the first sheet of the document 300 to the completion of feeding the second sheet of the document 300. As shown in FIG. 18, the image scanner 100 transfers right-side through reverse-side image data continuously at high speed (at a two-fold speed), and the document 300 is fed continuously with the ADF function.

(Embodiment 3)

Figure 19:
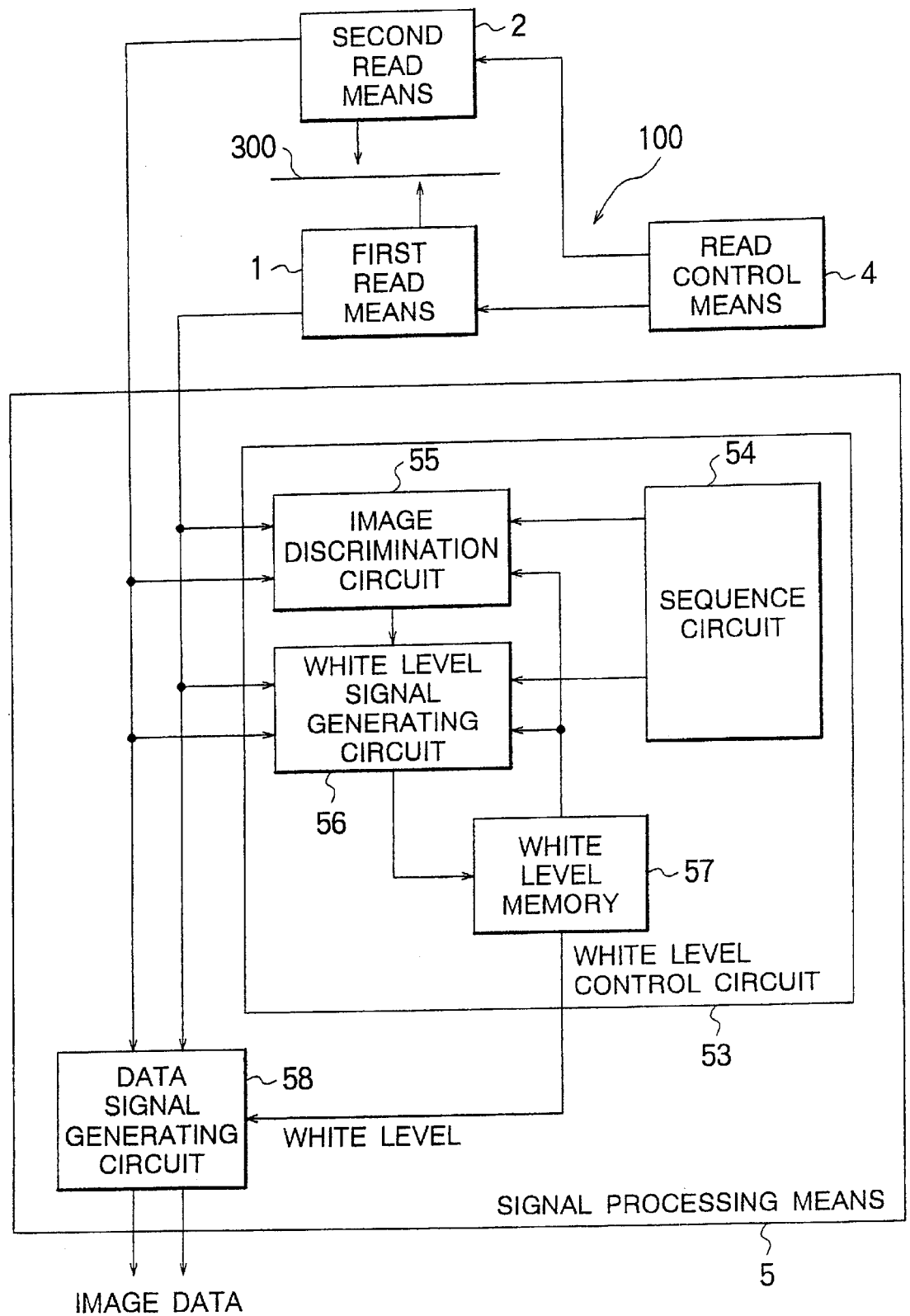
FIG. 19 is a block diagram illustrating the operating principle of a third embodiment of the present invention.

FIG. 19 is a block diagram illustrating the operating principle of the image scanner 100 that is the third embodiment of the present invention. The image scanner 100 comprises first read means 1 for reading image data on the right side of the document 300, second read means 2 for reading image data on the reverse side of the document 300, read control means 4 for controlling the first and second read means so that image data on the right and reverse sides of the document 300 can be read simultaneously, and signal processing means 5 for producing image data on the right and reverse sides of the document 300 by subjecting the image data simultaneously read by the first and second read means 1 and 2 under the control of the read control means 4 to predetermined operations. The signal processing means 5 comprises a white level control circuit 53 for calculating the white level (the standard value on the white basis) based on the image data read by the first and second read means 1 and 2, and a data signal generating circuit 58 for generating image data from the image data read by the first and second read means using the white level calculated by the white level control circuit 53.

The white level control circuit 53 comprises a sequence circuit 54 for controlling the execution of white level control that varies depending on image data reading steps, an image discriminating circuit 55 for generating an image data discriminating instruction by discriminating the state of the image data read by the first and second read means 1 and 2, and a white level signal generating circuit 56 for generating a new white level signal by subjecting the current white level signal to predetermined operations in accordance predetermined operation designating instruction corresponding to the image discriminating instruction generated by the image discriminating circuit 55 under the control of the sequence circuit 54, and a white level memory 57 for storing as the next white level signal a new white level signal output by the white level signal generating circuit 56.

According to the image scanner 100 of the present invention, image data reading speed can be substantially doubled by providing the first and second read means 1 and 2 separately, reading image data on the right and reverse sides of a double-sided manuscript simultaneously and producing image data based on the read image data. Furthermore, the white level control of the image data the amount of which has been doubled is carried out by dedicated hardware, called the white level control circuit 53, not by the periodic execution of the white level control program in the microprocessor. The burden on the microprocessor in white level control can therefore be reduced substantially.

When the white level control circuit 53 reads image data on the right and reverse sides of a double-sided manuscript by executing white level control, image data on almost all types of document 300 can be read clearly by improving the contrast of the document 300 having different shades by changing white level signal values corresponding to changes in the shades of the document, and correcting the uneven density of the manuscript. Consequently, image quality can be prevented from deteriorating even when too much data are read.

Furthermore, the sequence circuit 54 of the white level control circuit 53 executes different white level control in accordance with image data reading steps, and the image discriminating circuit 55 and the white level signal generating circuit 56 generate a white level signal. This enables white level control without using a microprocessor for controlling the image scanner having excellent signal processing performance, leading to reduced cost for the image scanner.

As shown in FIG. 4, the microprocessor 8 changes over white level modes in accordance with the predetermined instruction given by the operator from the outside of the image scanner 100. The microprocessor 8 generates a control signal necessary for executing these modes and enters it into the sequence circuit 54 to cause the sequence circuit 54 to carry out different modes of white level control.

Changeover of white level control modes is carried out by the operator in the following manner. When the document 300 is a line drawing manuscript, a mode in which white level control of the present invention is carried out to obtain a clear image (line drawing mode) is selected, while when the document 300 is a photograph manuscript, a mode in which white level control is not carried out to retain the atmosphere of the manuscript (photograph mode) is selected. In carrying out white level control, whether white level control is carried out by the white level control circuit 53 of the present invention (automatic mode), or the white level control program is carried out on the microprocessor 8 (MPU mode) is selected. The image scanner 100 has a white level control program 91 as shown in FIG. 20A, in addition to the white level control circuit 53.

The white level control circuit 53 of the signal processing means 5 (see FIG. 19) performs white level control processing to calculate the white level based on the entered digital signal (image data). The data signal generating circuit 58 of the signal processing means 5 (see FIG. 19) generates image data from the image data read by the first and second read means 1 and 2 using the white level calculated by the white level control circuit 53.

The data signal generating circuit 58 in FIG. 19 can be considered the same as the data signal generating circuit 52 in FIG. 1. The white level control circuit 53 is a circuit provided on the first stage of the data signal generating circuit 52 or 58. Or, the data signal generating circuit 52 may be considered to include the white level control circuit 53 and the data signal generating circuit 58.

Figure 20A:
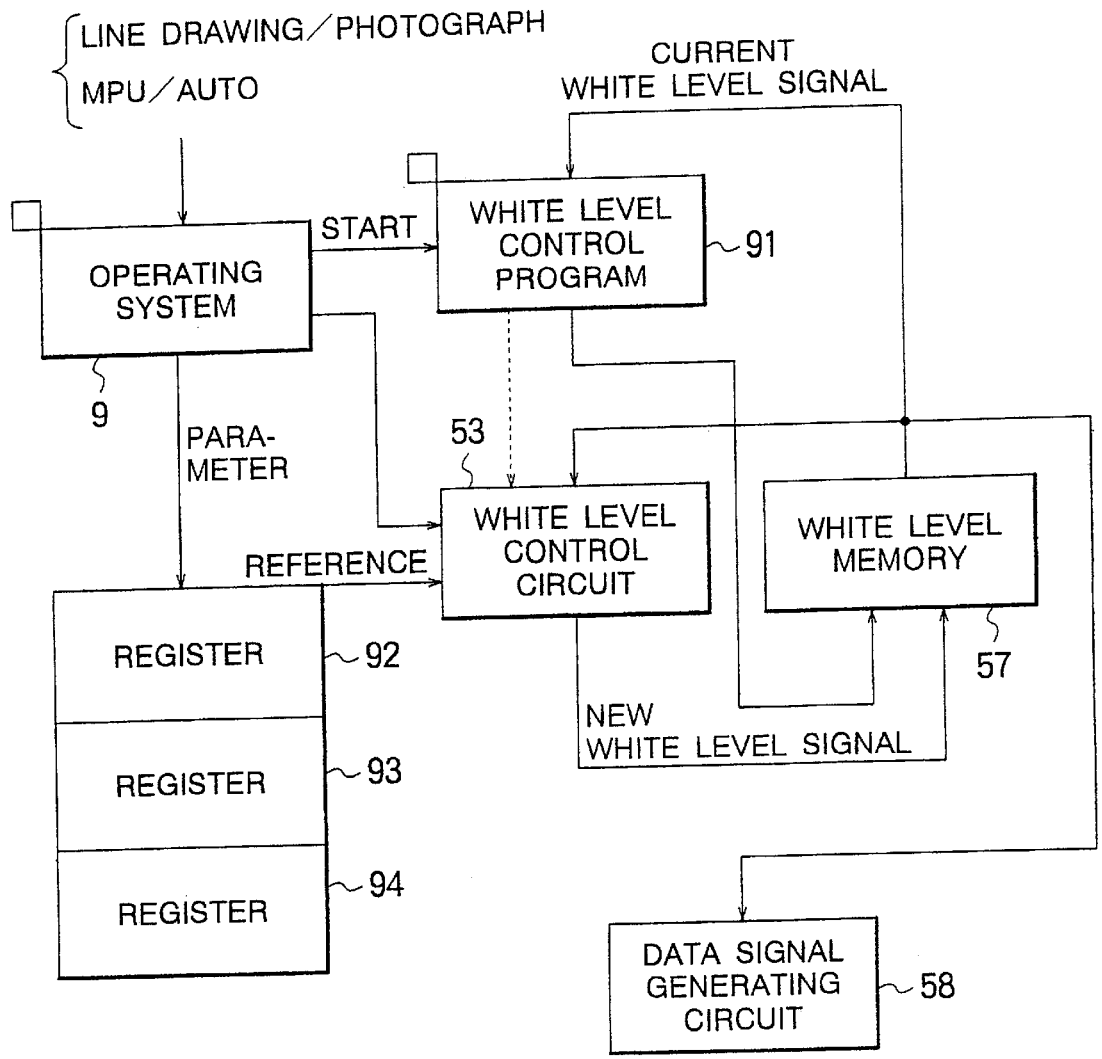
FIG. 20 is a diagram of assistance in explaining white level control.
Figure 20B:
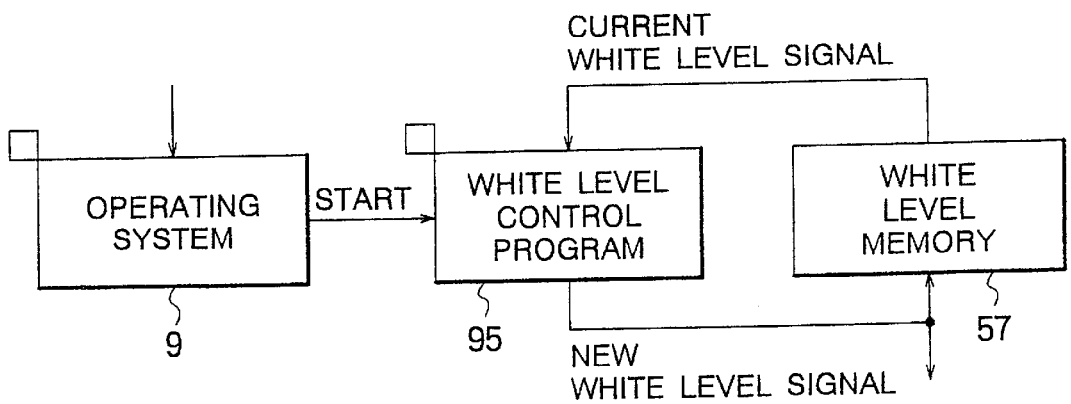

FIG. 20 is a diagram of assistance in explaining white level control. FIG. 20A illustrates white level control according to the present invention, and FIG. 20B illustrates the conventional white level control for reference. In FIG. 20A, an operating system 9 for controlling the entire image scanner 100 performs predetermined processing in accordance with the instruction for white level control given by the operator. When the operator gives an instruction for the line drawing mode where the document 300 is a line drawing manuscript (ordinary manuscript), white level control is carried out by the white level control program 91 or the white level control circuit 53. When the operator gives an instruction for the photograph mode where the document 300 is a photograph manuscript, control is effected not to perform white level control.

When the operator gives an instruction for the MPU mode where white level control is carried out under the control of the microprocessor (MPU control), the white level control program 91 is activated by the operating system 9 to perform white level control. When the operator's instruction is for the automatic mode where white level control is performed automatically (when viewed from the program), white level control is carried out by the white level control circuit 53.

In white level control, the current white level signal as the current white level control stored in the white level memory 57 is referenced. That is, white level control is the processing to correct the current white level signal in accordance with changes in the document 300. The current white level signal is a signal used for signal processing in the current data signal generating circuit 58, or a white level signal obtained from the image data (manuscript level signal) for the line one line before (immediately before) the line where the picture element now being read and subjected to signal processing exists.

When carrying out white level control with the white level control circuit 53, the operating system 9 automatically sets predetermined parameters to a register group. The register group comprises a register 92 for the sequence circuit 54, a register 93 for the image discriminating circuit 55, and a register 94 for the white level signal generating circuit 56. For example, parameters for the sequence circuit 54 are set in the register 92, and the same is carried out in other registers. Parameters in the register 92 through 94 are referenced by the corresponding circuits. As predetermined parameters are set in the register 92, the sequence circuit 54 starts operating. This causes the white level control circuit 53 to start operating to execute predetermined white level control automatically (without the intervention of software). A new white level signal as an output of the white level control circuit 53 is stored in the white level memory 57. The new white level signal stored in the white level memory 57 is used as a current white level signal in white level control for the next line.

The register group is part of the register group in the microprocessor 8 to be used by the operating system 9. The operating system 9 and the white level control program 91 are stored in a memory (not shown). The white level memory 57 uses a predetermined area of the memory (not shown) and is controlled by the white level control circuit 53.

In executing white level control, the white level control program 91 activated by the operating system 9 actually does not calculate a new white level signal merely by executing the program, but operates the white level control circuit 53 in a predetermined operating mode to further process the calculated white level signal to output as a new white level signal.

In the conventional white level control practice, the white level control program 95 activated by the operating system 9 has calculated a new white level signal merely by executing the program and stored it in the white level memory 57, as shown in FIG. 20B. The white level control program 91 is different from the white level control program 95 though the same name is used for convenience.

Figure 21:
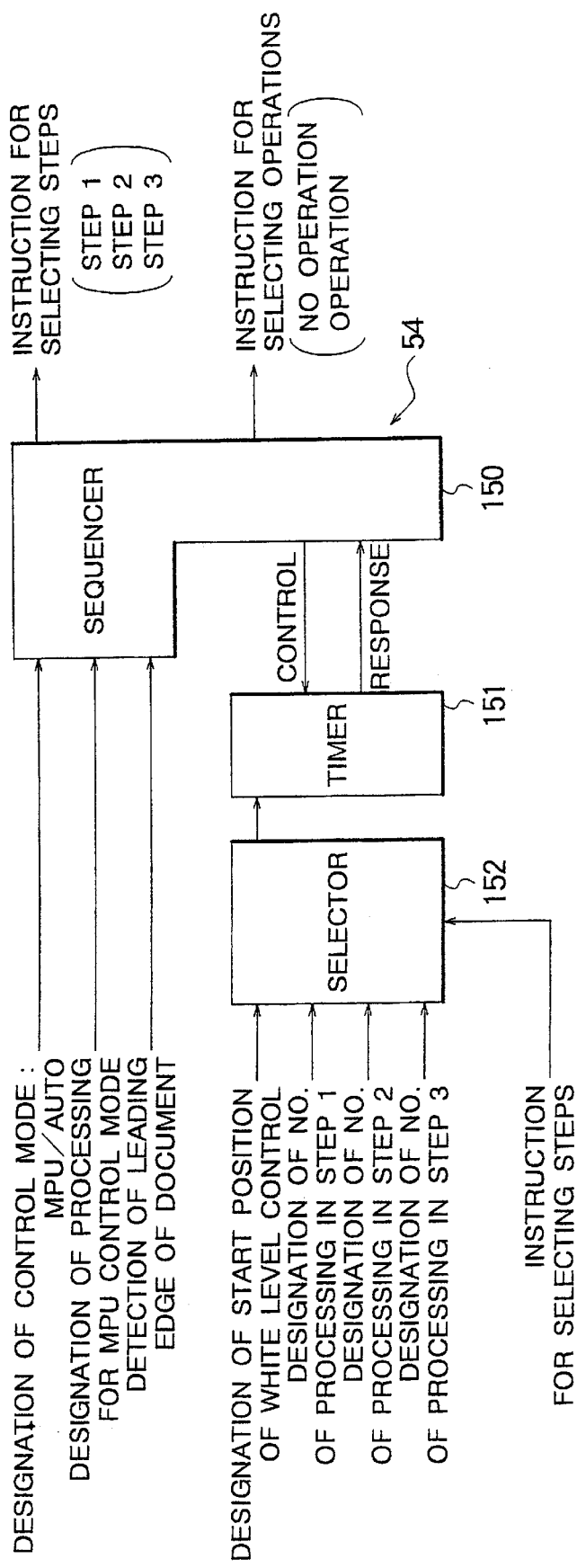
FIG. 21 is a block diagram of a sequence circuit.

FIG. 21 is a block diagram illustrating a sequence circuit. The sequence circuit 54 comprises a sequencer 150, a timer 151 and a selector 152. The sequence circuit 54 controls the execution of mutually different white level control, depending on the steps of image data reading from the document 300.

To this end, the following parameters are entered into the sequence circuit 54. That is, a signal for designating control mode; MPU (mode)/Auto (mode) (hereinafter referred to as a control mode designating signal), a signal for designating processing at the time of MPU control (hereinafter referred to as a processing designating signal), a signal for detecting document end generated by a document end detection sensor (not shown), a signal for designating the start position of white level control (hereinafter referred to as a position designating signal), and a signal for designating the number of processing steps from Steps 1 through 3 (hereinafter referred to as a number of processing steps designating signal) are entered. These parameters are set in the register 92 for the sequence circuit 54 in FIG. 20 by the microprocessor 8 or the operating system 9. The document end detection signal is set by the document end detection sensor.

The sequencer 150, upon receipt of the control mode designating signal, processing designating signal and the document end detection signal, generates a step selecting instruction and an operation selecting instruction. The step selecting instruction is a control signal generated in accordance with image data reading steps to execute mutually different white level control depending on the steps. To achieve this, the timer 151 and the selector 152 are used. The operation selecting instruction is a control signal for selecting the results of operations for generating white level signals in the white level signal generating circuit 56.

The step selecting instruction comprises any signal of Steps 1, 2 and 3. Processing is prohibited for a predetermined period from the detection of the end of the document 300, and no step selecting instruction is output. That is, this period is regarded as a processing inhibit period (or may be considered as Step 0). White level control is repeated for each of the document 300 in the order of the processing inhibit period, Step 1, Step 2 and Step 3. During the processing inhibit period, no adjustment processing of a white level signal is performed. In Step 1, the processing of adjusting the white level signal over a relatively wide range (the first signal range) is performed. In Step 2, the processing of adjusting the white level signal over a relatively narrow range (the second signal range) is performed. In Step 3, the processing of adjusting the white level signal over an extremely narrow range (the third signal range) is performed.

The operation selecting instruction comprises any of no-operation, operation and initial value load signals. The no-operation signal instructs an operation not to select the operation results in the white level signal generating circuit 56. The operation signal instructs an operation to select the operation results in the white level signal generating circuit 56. The initial value load is a special mode in which the initial value of a predetermined white level signal is output. The initial value is retained in advance at a predetermined location in the white level memory 57.

The timer 151 is used to form different step selecting instructions, depending on the steps of image data reading by the sequencer 150. The timer 151 starts counting in accordance with a predetermined control signal input from the sequencer 150. Upon completion of counting, the response is output to the sequencer 150. The time elapsed from the input of the control signal to the output of the response is determined by the selector 152. The selector 152, upon receipt of the input of the position designating signal, and the processing number designating signal of Steps 1 through 3, generates a signal for controlling the timer 151. A step selecting instruction is input to the selector 152 from the sequencer 150. Wit this, a processing number designating signal corresponding to the step is selected from among the processing number designating signals, and used for processing.

The sequence circuit 54 is operated in the following manner. When the control mode designating signal is an instruction input for the auto mode in which white level control is controlled automatically, the sequencer 150 controls the white level control circuit 53 and other circuits to start the execution of white level control by the white level control circuit 53.

In response to the document end detection signal entered after the instruction input for the auto mode, the sequencer 150 enters a control signal (start signal) to the timer 151, turns the step selecting instruction to the state of Step 0 (the state where none of Steps 1 through 3 is output), and generates a no-operation signal as the operation selecting instruction. A Step 0 signal is entered to the selector 152. In response to it, the selector 152 selects and outputs the position designating signal as a signal corresponding to Step 0. The timer 151 starts counting in accordance with the start signal, and returns the response to the sequencer 150 as the count value equals to the position designating signal.

The position designating signal is output for a period when the document 300 is fed by 100 read lines (for 100 picture elements) in the feeding direction, for example. The position designating signal is a document-end margin for reading. The Step 0 period equals to the state where white level control is not performed for 100 lines from the end of the document 300 since the operation results of the white level signal generating circuit 56 are not selected by the no-operation signal. This prevents erroneous white level control from being executed when the document 300 is fed slightly obliquely, for example.

Upon receipt of a response from the timer 151, the sequencer 150 sends a control signal (restart signal) to the timer 151, and generates a Step 1 signal and an operation signal as the operation selection signal. Upon receipt of the Step 1 signal, the selector 152 enters the number of steps designating signal for Step 1 to the timer 151. The timer 151 starts counting in response to the restart signal, and returns a response to the sequencer 150 when the count value equals to the number of steps designating signal for Step 1. After that, the processing of Step 2 is performed in the same manner. During the period, an operation signal is output from the sequencer 150.

The processing number designating signals for Steps 1 and 2 are also generated during the period when the document 300 is fed by 100 read lines in the feeding direction, for example. With this, the operation results of the white level signal generating circuit 56 are selected by the operation signal during the period of Steps 1 and 2, and therefore white level control is performed for the 100 lines. White level control is performed over a relatively wide range for 101 to 200 lines on the document 300, and over a relatively narrow range for 201 to 300 lines. As a result, white level signals are converged to a value almost suited to the document 300 at the time of completion of Step 2.

Upon receipt of a response from the timer 151, the sequencer 150 sends a control signal (restart signal) to the timer 151, and generates a Step 3 signal as the step selecting instruction, and first generates a no-operation signal as the operation selecting instruction. Upon receipt of the Step 3 signal, the selector 152 enters the number of steps designating signal for Step 3 into the timer 151. The timer 151 starts counting in response to the restart signal, returns the response to the sequencer 150 as the count value equals to the processing number designating signal for Step 3, and restarts counting automatically. The timer 151 returns the response to the sequencer 150 every time the count value equals to the processing number designating signal for Step 3. In Step 3, the sequencer 150 generates an operation signal as the operation selecting instruction every time it receives the response from the timer 151.

Consequently, the meaning of the processing number designating signal for Step 3 is different from that of the processing number designating signals for Steps 1 and 2. Since Step 3 is performed up to the tail end (3000 lines, for example) of the document 300, the processing number designating signal for Step 3 does not designate the period of Step 3, but indicates the interval of time in which white level control is performed in Step 3. As white level signals are converged to a value almost suited to the document 300 by the processing up to Step 2, it makes no sense to repeat white level control for each line to be stored. The processing number designating signal for Step 3 is generated during the period in which the document 300 is fed by 100 read lines in the feeding direction. With this, white level control is carried out over an extremely narrow range for every 100 lines (400 lines, 500 lines, - - - ) from the leading end of the document 300 to the 301st line and over (to the tail end).

Figure 22:
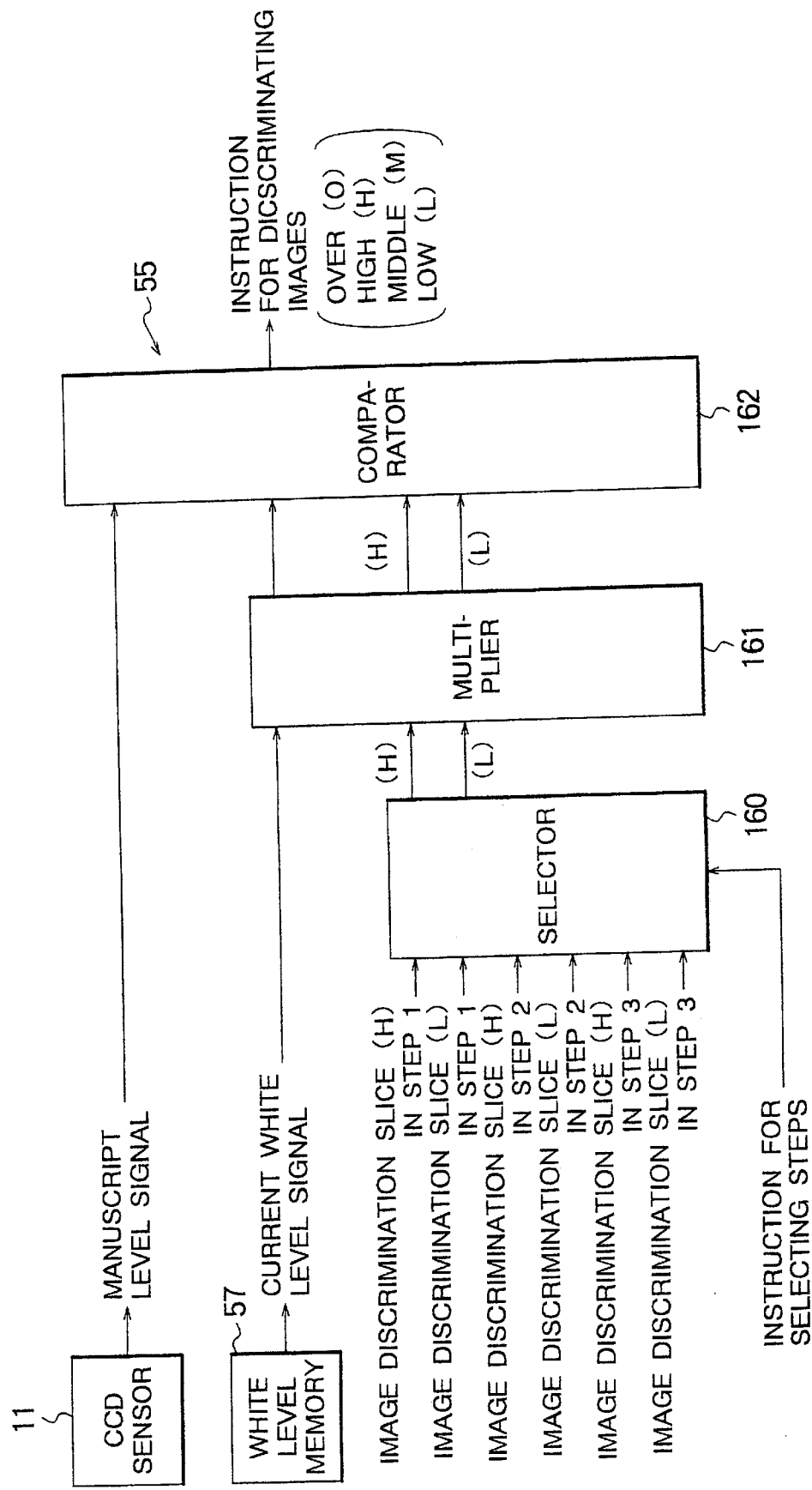
FIG. 22 is a block diagram of an image discriminating circuit.

FIG. 22 is a block diagram illustrating an image discriminating circuit. The image discriminating circuit 55 comprises a selector 160, a multiplier 161 and a comparator 162, and forms an image discriminating instruction by discriminating the state of an image based on the image data (manuscript level signal) read by the first and second read means 1 and 2.

The manuscript level signal generated by a CD sensor 11 in the first and second read means 1 and 2 is entered into the comparator 162 after delayed by a predetermined timing. In Steps 1 through 3, therefore, the manuscript level signal from the CD sensor 11 is entered into the comparator 162.

The step selecting instruction and the parameter thereof from the sequencer 150 are entered into the selector 160. That is, a predetermined image discriminating slice (herein after referred to as slice signal) as the parameter is entered. Two slice signals of H (high level) and L (low level) for each of Steps 1 through 3, six slice signals in total, are provided. These parameters are set to the register 93 for the image discriminating circuit 55 in FIG. 20 by the microprocessor 8 or the operating system 9. The selector 160 selects two slice signals (H and L) corresponding to that step in accordance with the step selecting instruction from the sequencer 150.

The multiplier 161 generates an actual slice level signal using the two slice signals (H and L) from the selector 160 and the current white level signal from the white level memory 57. Since white level control is the processing to correct white level using the white level signal (current white level signal) immediately before that line, an actual slice level signal for discriminating image is also generated using the current white level signal. The multiplier 161 generates the two slice signals (H and L)by multiplying the current white level signal by the values of the two slice signals (H and L). An actual slice level signal is a signal actually used for slicing the manuscript level signal in image discrimination in the next stage of the comparator 162. The multiplier 161 outputs the current white level signal as it is, in addition to these two slice level signals (H and L).

The manuscript level signal, the two slice level signals (H and L) from the multiplier 161 and the current white level signal are entered into the comparator 162. The comparator 162 compares the manuscript level signal with the two slice level signals (of H and L) and the current white level signal, and forms and outputs an image discriminating instruction.

The comparator 162 generates an OVER (O) as the image discriminating instruction when the manuscript level signal is larger than the current white level signal. When the manuscript level signal is smaller than the current white level signal and larger than the slice level signal (H), the comparator 162 generates a HIGH (H). When the manuscript level signal is smaller than the slice level signal (H) and larger than the slice level signal (L), a MIDDLE (M) is generated. When the manuscript level signal is smaller than the slice level signal (L), a LOW (L) is generated. The meaning of each image discriminating instruction will be described later. The slice level signal H and L are different from the image discriminating instructions H and L.

As described above, the white level signal is adjusted over a relatively wide range in Step 1, over a relatively narrow range in Step 2, and over an extremely narrow range in Step 3. For this reason, slice signals as parameters are set as follows: The slice signals H and L in Step 1 are set to 0.95 and 0.80, respectively, so that slice level signals equal to 95% and 80% of the current white level signal can be obtained as the results of multiplication. If the manuscript level signal is larger than 95% of the current white level signal, for example, an image discriminating instruction HIGH (H) is formed. The slice signals H and L in Step 2 are set to 0.98 and 0.95, and the slice signals in Step 3 to 0.99 and 0.98, respectively.

The white level signals, which are equivalent to the manuscript level signal, comprise 8-bit signals representing 256 scales, for example. The slice signals are absolute numbers, as described earlier. Consequently, the slice level signals become 8-bit signals representing 256 scales. Operation results are rounded off, for example. The same also applies to the following description.

The image discriminating circuit 55 operates in the following manner. In Step 0, the output of the selector 33 is nullified, while in Steps 1 through 3, any of the image discriminating instructions O, H, M and L is output by the selector 33 in accordance with the value of the manuscript level signal. That is, the results of discrimination of the current state of image are obtained to be used for correcting white level signals in the white level signal generating circuit 56. Although the types of the image discriminating instructions obtained in Steps 1 through 3 are identical (four types), different white level control is performed in each Step by setting the slicing parameters to different values.

Figure 23:
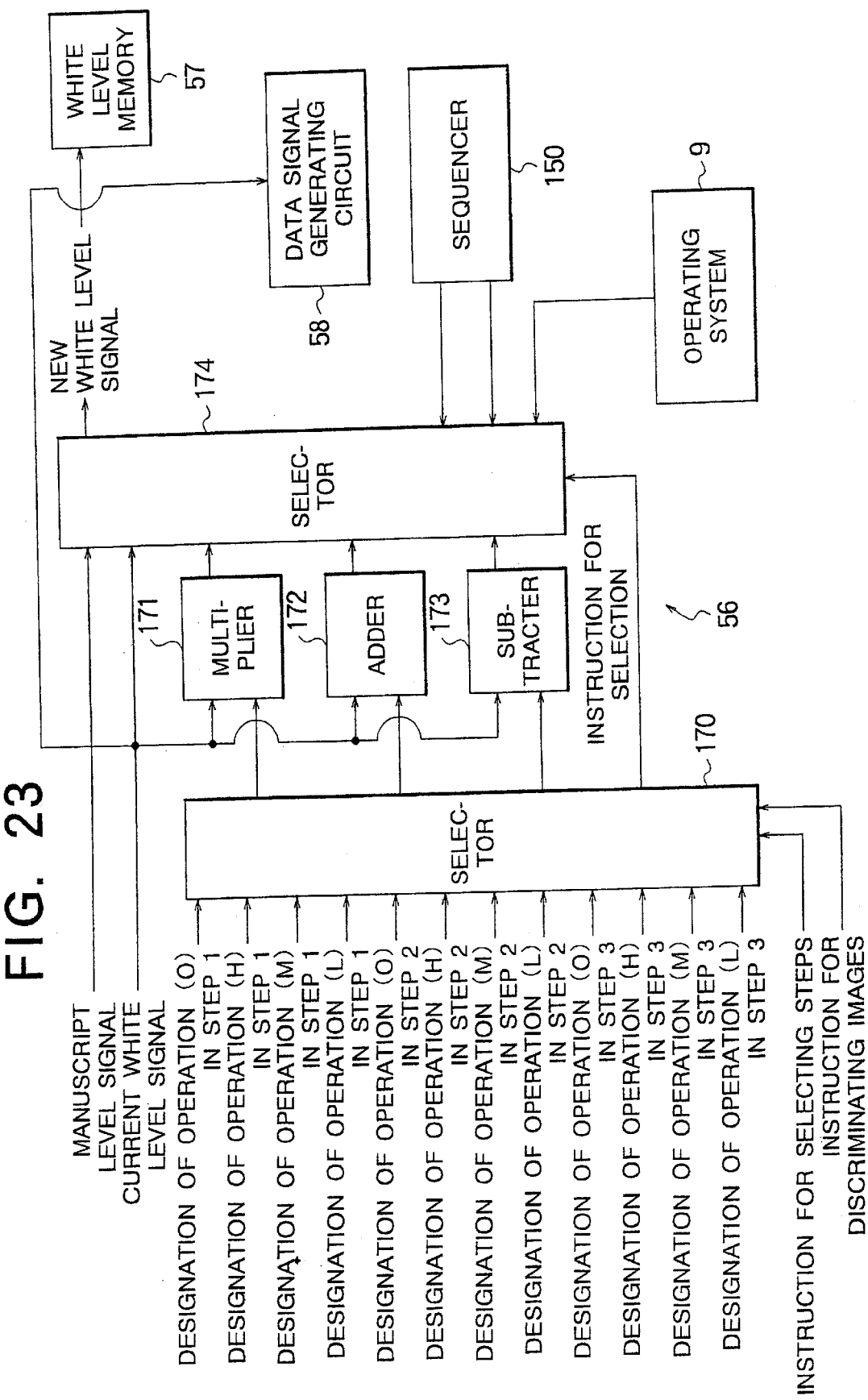
FIG. 23 is a block diagram of a white level signal generating circuit.

FIG. 23 is a block diagram illustrating the white level signal generating circuit. The white level signal generating circuit 56 comprises a selector 170, a multiplier 171, an adder 172, a subtracter 173, and a selector 174, and generates a new white level signal by subjecting the current white level signal to predetermined operations in accordance with a predetermined operation processing designation instruction corresponding to the image discriminating instruction formed by the image discriminating circuit 55 under the control of the sequence circuit 51.

To achieve this, parameters for that purpose are entered into the white level signal generating circuit 56. That is, operation processing designations (hereinafter referred to as processing designating signals) for Steps 1 through 3 are entered. Four processing designating signals (O, H, M and L) for each step, a total of 12 processing designating signals, are provided. These parameters are set to the register 94 of the white level signal generating circuit 56 shown in FIG. 20 by the microprocessor 8 or the operating system 9. Operation designating signals comprise selecting instructions for designating the types of operations, and operation coefficients used for operations.

The step selecting instruction from the sequencer 150 and the image discriminating instruction and the operation designating signal for the comparator 162 are entered into the selector 170. The selector 170 selects and outputs the corresponding operation designating signals in accordance with the step selecting instruction and the image discriminating instruction. If the step selecting instruction is Step 1 and the image discriminating instruction is OVER (O), for example, the operation designating signal (O) for Step 1 is selected.

The operation coefficient among the operation designating signals generated by the selector 170 is entered in parallel into the multiplier 171, the adder 172 and the subtracter 173, and the current white level signal from the white level memory 57 is also entered in parallel. The multiplier 171, the adder 172 and the subtracter 173 output the values obtained by subjecting the current white level signal to operations using the entered operation coefficient. Assume that the operation coefficient is 1.5, for example. The multiplier 171 outputs the value obtained by multiplying the current white level signal by 1.5. The adder 172 and the subtracter 173 output the value obtained by adding 1.5 to the current white level signal, and the value obtained by subtracting 1.5 from the current white level signal, respectively.

The selector 174 receives the manuscript level signal, the current white level signal, the outputs of the multiplier 171, the adder 172 and the subtracter 173 (multiplication output, addition output and subtraction output), the control output of the selector 170 (operation designating signal selecting instruction), the step selecting instruction and the operation selecting instruction from the sequencer 150, and the control signal from the operating system 9, performs predetermined processing in accordance with them, and generates a new white level signal. The new white level signal is stored in the white level memory 57, and used as the current white level signal in white level processing for the next line.

The white level signal generating circuit 56 operates in the following manner. Upon receipt of a control signal from the operating system 9, the selector 174 outputs the manuscript level signal as it is. In this case, the no-operation signal is entered from the sequencer 150. This mode is a special mode used to obtain the standard value of the white level signal by reading the image output from a known white level board, for example, and executed by the operating system 9 when turning on the power of the image scanner 100 or starting the scanner 100. The standard value is used as the initial value for white level control, for example.

In Step 0, the selector 174 outputs the current white level signal as it is as a new white level signal based on the no-operation signal from the sequencer 51. That is, no white level control is performed. In Steps 1 and 2, upon receipt of the operation signal from the sequencer 51 and the operation designating signal selecting instruction from the selector 170, the selector 174 selects one output corresponding to the selecting instruction from among the outputs of the multiplier 171, the adder 172 and the subtracter 173.

In Step 3, when the no-operation signal is received from the sequencer 51, the selector 174 outputs the current white level signal as it is as a new white level signal regardless of the outputs of the multiplier 171, the adder 172 and the subtracter 173. That is, not white level control is performed. When the operation signal is received from the sequencer 51, the selector 174 selects one output corresponding to the operation designating signal selecting instruction from the selector 170 from among the outputs of the multiplier 171, the adder 172 and the subtracter 173, and outputs it as a new white level signal.

As described above, the white level signal is adjusted over a relatively wide range in Step 1, over a relatively narrow range in Step 2, and over an extremely narrow range in Step 3. In the image discriminating instruction OVER (O) where the manuscript level signal is larger than the current white level signal, the white level signal must be made larger than the current white level signal. In the image discriminating instruction HIGH (H) where the manuscript level signal is smaller than the current white level and larger than the slice level signal (H), the manuscript level signal is almost equal to the current white level, that is, the white level signal is at almost appropriate level. In the image discriminating signal MIDDLE (M) where the manuscript level signal is smaller than the slice level (H) and larger than the slice level signal (L), the white level signal must be smaller than the current white level signal. In the image discriminating signal LOW (L) where the manuscript level signal is smaller than the slice level signal (L), the manuscript level is judged to be a signal that is closer to the black level, that is, an information signal representing an image. That is, this is the case where white level control is impossible (unnecessary).

The processing designating signals as parameters are set as follows: The processing designating signal OVER (O) in Step 1 is set as an instruction signal obtained by multiplying the current white level signal by an operation coefficient of 1.5, for example. Consequently, the instruction to select this processing designating signal is "×(multiplication)," and the operation coefficient is "1.5." This is expressed by (×, 1.5). Similarly, the remaining processing designating signals H, M and L in Step 1 are (×, 0.9), (×, 0.5) and (×, 1.0), respectively. The processing designating signals O, H, M and L in Step 2 are (×, 1.2), (×, 0.9), (×, 0.8) and (×, 1.0), respectively. The processing designating signals O, H, M and L in Step 3 are (×, 1.0), (±, 0.0), (×, 1.0) and (±, 0.0), respectively. Symbol "+" here represents addition, "−" subtraction, and "±" addition and subtraction.

In Step 1, when the manuscript level signal is smaller than 95% of the current white level signal and larger than 80% thereof, an image discriminating instruction M is formed, and a new white level signal is set to a value 0.5 times the current white level signal. Even when the same image discriminating instruction M is formed, a new white level signal is set to a value 0.8 times the current white level signal in Step 2 where the manuscript level signal is smaller than 98% of the current white level signal and larger than 95% thereof. The white level signal is adjusted over a narrower range than in Step 1, and therefore the white level is converged to a value suited to the document 300. In Step 3, on the other hand, where the manuscript level signal is smaller than 99% of the current white level signal and larger than 98% thereof, an image discriminating instruction M is formed and a new white level signal is set to a value obtained by subtracting 1 from the current white level signal. The white level signal is adjusted over a much narrower range than in Steps 1 and 2. The white level signal is only adjusted to cope with the uneven density of the document 300, noise, etc.

Figure 24:
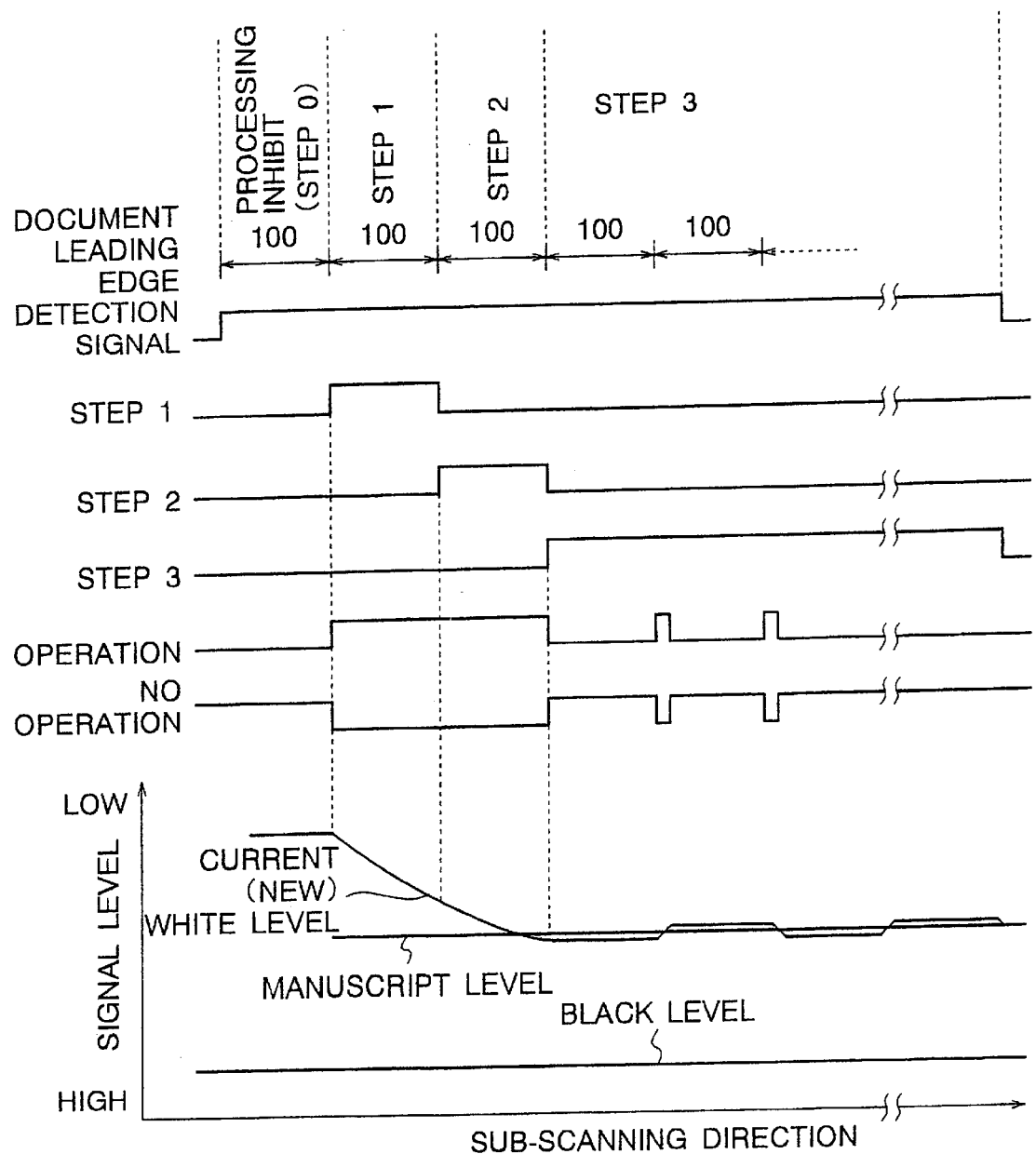
FIG. 24 is a conceptual diagram of white level control.

FIG. 24 is a conceptual diagram illustrating white level control. The abscissa denotes the signal level of white level signal, and the ordinate the sub-scanning direction. In the figure, the signal level of the white level signal is plotted in such a manner as to increase toward the black level. The sub-scanning direction is equal to the feeding direction of the document 300.

As the operator enters instructions for the line drawling mode and the automatic mode, the operating system 9 sets predetermined parameters to the registers 92 through 94, as shown in FIG. 20A. This activates the white level control circuit 53 to perform white level control as shown in FIG. 24. The processing inhibit period, the Steps 1 and 2 periods, the time interval in which white level control of Step 3 is performed are variable to values that are different from each other.

After the feeding of the document 300 has been started and a document end detection signal has been entered (high level), signals for Steps 1 through 3 are kept at the low level during the processing inhibit period for 100 lines. This causes the current white level signal to be output as it is from the selector 174. As a result, the white level signal maintains the initial value thereof. The initial value is formed using a known white level board, etc. and stored in the white level memory 57.

Next, as Step 1 signal is output (changed to a high level), the processing for Step 1 is performed during the next 100 lines. Since the value of the slice signal (parameter) in Step 1 is relatively large, white level control is performed over a relatively wide signal range in Step 1. The multiplier 161 generates a slice level signal corresponding to the current white level signal, based on which an image discriminating signal that has discriminated the state of the manuscript level signal is generated from the comparator 162, a processing designating signal corresponding to the image discriminating instruction is generated from the selector 170, and an operation signal is generated (at a high level). Thus, the operation results corresponding to the processing designating signal are output by the selector 174. This is a new white level signal. As a result, the value of the new white level signal quickly approaches to the manuscript level signal (the actual white level of the document 300), as shown in the figure.

Next, Step 2 signal is output and the processing for Step 2 is carried out during the next 100 lines. As the value of the slice signal for Step 2 is relatively small, white level control is carried out over a relatively narrow signal range in Step 2. As a result, the value of the new white level signal gradually becomes closer to the manuscript level signal.

Next, Step 3 signal is output and the processing for Step 3 is carried out for the remaining lines of the document 300. Since the value of the slice signal for Step 3 is very small, white level control is performed over an extremely narrow signal range in Step 3. In Step 3, the operation signal is output (changed to the high level) for every 100 lines, and the no-operation signal is stopped (changed to the low level). White level control is therefore carried out over an extremely narrow signal range for every 100 lines. As a result, the value of the new white level signal is changed for every 100 lines in accordance with changes in the manuscript level signal.

As the operator enters the line drawing mode and the MPU mode, the white level control program 91 activated by the operating system 9 executes white level control at a predetermined cycle, as shown in FIG. 20A. At this time, the white level control program 91 operates the white level control circuit 53 in a predetermined mode (Step 1).

The white level control program 91 sets parameters to the registers 92 through 94 in the same manner as with the operating system 9. Unlike the operating system 9 (which does not specify anything), however, only the MPU control designating signal is entered to give instructions so that the processing and processing inhibit are specified. With this, the sequencer 150 outputs Step 1 signal and Signal 0 signal as step selecting instructions. Other operations of the white level control circuit 53 are the same as those described earlier. Thus, Step 1 signal and Step 0 signal are output, and the processing and the inhibit processing for Step 1 are carried out until the tail end of the document 300. Furthermore, since the operation signal is output in Step 1, the operation results corresponding to Step 2 or 3 are output from the selector 174 by changing the slice and operation designation in Step 1.

As the operator entered the photograph mode, the white level control circuit 53 is controlled by the control signal from the operating system 9, as shown in FIG. 23, and the manuscript level signal is output as it is from the selector 174. Consequently, white level control is not performed in the photograph mode.

As described above, the present invention makes it possible, in an image scanner having the double-side read mode for reading image data on the right and reverse sides of a document, to binarize the enhanced and interpolated image data obtained by image enhancement and interpolation processing using the floating slice level that changes in accordance with image data values in the neighborhood of the image data. This enables to increase resolution seemingly and eliminate the effects of the surrounding picture elements on the image data, leading to improved resolution through signal processing without changing the configuration of the optical system and increasing the cost of the image scanner. Since the signal processing involved is simple, real-time signal processing is possible even when the amount of image data is increased. Thus, the present invention makes it possible to improve resolution and increase reading speed without increasing the cost of the image scanner by adopting the optimum signal processing for increasing resolution.

The present invention makes it possible to read image data on the right and reverse sides of a document simultaneously, and makes variable the transfer rate to the host computer of the read image data. This allows image data on a double-sided manuscript to be entered at high speed without the intervention of the operator. This leads to improved throughput per unit time in processing business documents in the host computer, and makes it possible to use the same interface as that used for transferring the conventional image data. As a result, the image scanner according to the present invention can be connected to a host computer having an interface for connecting the conventional image scanner (one-side scanner) without changing the interface. As a result, image data can be entered at higher speed while maintaining the logical and physical interchangeability with the conventional image data interface.

Furthermore, the present invention makes it possible not only to read image data on the right and reverse sides of a document simultaneously but also to carry out mutually different white level control depending on the stages of image data with dedicated hardware called the white level control circuit. By doing this, image data read rate can be substantially doubled, and the white level control of the doubled amount of image data can be carried out without placing additional burden on the microprocessor. The image scanner of the present invention can clearly read image data on almost all types of document paper, including newsprint and wood free paper, regardless of changes in the texture of paper, uneven density of manuscript, the light intensity of the light source, etc. Even when the amount of data reading is increased, the quality of image data can be prevented from deteriorating. As a result, the performance of the image scanner can be improved without using a microprocessor of superior signal processing performance for image scanner control.

What is claimed is:

1. An image scanner comprising:
   first read means for reading image data on the right side of a document,
   second read means for reading image data on the reverse side of said document;
   read control means for controlling said first and second read means so that image data on the right and reverse sides of said document can be read simultaneously; end signal processing means for producing image data on the right and reverse sides of said document by subjecting image data read simultaneously by said first and second read means under the control of said read control means to predetermined operations,
   said signal processing means comprising
   a white level control circuit that calculates white level based on image data read by said first and second read means, and
   a data signal generating circuit that generates image data from image data read by said first and second read means using white level calculated by said white level control circuit;
   said white level control circuit having
   a sequence circuit that controls the execution of mutually different white level control depending on the stage of reading image data,
   an image discriminating circuit that produces an image discriminating instruction by discriminating the state of an image data read by said first and second mad means under the control of said sequence circuit,
   a white level signal generating circuit that generates a new white level signal by subjecting a current white level signal to predetermined operations in accordance with a predetermined operation designation instruction corresponding to an image discriminating instruction formed by said image discriminating circuit, and
   a white level memory that stores a new white level signal generated by said white level signal generating circuit as the next white level signal.

2. An image scanner as claimed in claim 1, wherein said sequence circuit comprises
   a sequencer that produces a step selecting instruction in accordance with the image data reading;
   a timer that starts counting upon receipt of a predetermined control signal given by said sequencer and outputting a response to said sequencer upon completion of counting; and
   a selector that produces a control signal for said timer in accordance with a step selecting instruction from said sequencer and predetermined parameters,
   said sequencer outputting a control signal to said timer and bringing a step selecting signal to a predetermined state, and upon receipt of a response from said timer, bringing a step selecting instruction to a predetermined state,
   said selector selecting and outputting to said timer a parameter corresponding to a step selecting instruction, and
   said timer starting counting in accordance with said control signal from said sequencer and returning a response to said sequencer when the count value becomes equal to said parameter from said selector.

3. An image scanner as claimed in claim 2, wherein
   a step selecting instruction comprises any of a Step 1, Step 2 or Step 3 signal, and
   white level control is repeated for each document in said image scanner in the order of a processing inhibit period, Step 1, Step 2 and Step 3, and wherein in Step 1, a white level signal is adjusted over a wide range, in Step 2, said white level signal is adjusted over a first narrow range narrower than the wide range, and in Step 3, said white level signal is adjusted over a second narrow range, narrower that the first narrow range.

4. An image scanner as claimed in claim 2, wherein said image discriminating circuit comprises
- a selector that outputs, based on a step selecting instruction from said sequencer and predetermined parameters, two parameters H and L corresponding to steps selected by said step selecting instruction,
- a multiplier that produces two slice level signals H and L using said two parameters H and L from said selector and a current white level signal, and
- a comparator that produces and outputs an image discriminating instruction based on a current white level signal, image data read by said first and second read means, and two slice level signals H and L from said multiplier;

parameters K and L each for Step 1, Step 2 and Step 3 increase in magnitude in that order, and said comparator forms an image discriminating instruction O when a manuscript level signal is larger than a current white level signal, an image discriminating signal H when said manuscript level signal is larger then a slice level signal H, an image discriminating signal M when said manuscript level signal is larger than a slice level signal L, and an image discriminating signal L when said manuscript level signal is smaller than a slice level signal L, respectively.

5. An image scanner as claimed in claim 4, wherein said white level signal generating circuit comprises
- a first selector that receives a step selecting instruction from said sequencer an image discriminating instruction from said comparator and predetermined parameters; and selects and outputs corresponding parameter,
- a multiplier, adder and subtracter that subject a current white level signal to predetermined operations based on said parameters output by said selector, and
- a second selector that receives a current white level signal, outputs of said multiplier, adder and subtracter, parameters output by said selector, and a step selecting instruction from said sequencer, end selects and outputs as a new current white level signal any corresponding one from among said current white level signal, said outputs of said multiplier, adder and subtracter, based on said parameters and said step selecting instruction.

6. An image scanner as claimed in claim 5, wherein said second selector of said white level signal generating circuit
- selects and outputs as a new white level signal any corresponding one from among outputs of said multiplier, adder and subtracter in Steps 1 and 2,
- selects end outputs as a new white level signal any corresponding one from among outputs of said multiplier, adder and subtracter when said timer returns a response to a control signal from said sequencer in Step 3, and
- outputs a current white level signal as a new white level in other cases.

7. An image scanner as claimed in claim 6, wherein parameters for said selector of said sequence circuit, parameters for said selector of said image discriminating circuit, and parameters for said first selector of said white level signal generating circuit are given in accordance with an instruction given from the outside of said image scanner.

8. An image scanner as claimed in claim 1, wherein said image scanner has
- an operating system that controls said image scanner as a whole, and
- a white level control program unit that performs white level control by calculating a white level signal through predetermined processing,
- said operating system selecting either the execution of white level control with said white level control circuit or said white level control program unit.

9. An image scanner as claimed in claim 8, wherein said operating system, when selecting the execution of white level control with said white level control circuit, sets parameters for said sequence circuit, said image discriminating circuit and said white level control circuit to predetermined registers, thereby starting the execution of white level control.

* * * * *

UNITED STATES PATENT AND TRADEMARK OFFICE
CERTIFICATE OF CORRECTION

PATENT NO. : 6,760,131 B2  
APPLICATION NO. : 09/826912  
DATED : June 6, 2004  
INVENTOR(S) : Yukio Kaji Page 1 of 1

It is certified that error appears in the above-identified patent and that said Letters Patent is hereby corrected as shown below:

Column 2, Line 3, after "means" insert -- . --.
Column 10, Line 7, after "data" insert -- . --.
Column 12, Line 29, delete "2n black" and insert -- 2n = black -- therefor.
Column 13, Line 13, after "as shown in FIG. 7" delete ",".
Column 13, Line 36, delete "2(n-1) white" and insert -- 2(n-1) = white -- therefor.
Column 15, Line 63, delete "2NX" and insert -- 2N-X -- therefor.
Column 28, Line 62, delete "Wit" and insert -- With -- therefor.
Column 30, Line 50, delete "(H and L)by" and insert -- (H and L) by -- therefor.
Column 33, Line 59, delete "drawling" and insert -- drawing -- therefor.
Column 35, Line 67 (claim 1, line 8), delete "end" and insert -- and -- therfor.
Column 36, Line 20 (claim 1, line 28), delete "mad" and insert -- read -- therefor.
Column 37, Line 40 (claim 5, line 14), delete "end" and insert -- and -- therefor.

Signed and Sealed this

Twenty-first Day of November, 2006

JON W. DUDAS
*Director of the United States Patent and Trademark Office*

UNITED STATES PATENT AND TRADEMARK OFFICE
CERTIFICATE OF CORRECTION

PATENT NO. : 6,760,131 B2 Page 1 of 1
APPLICATION NO. : 09/826912
DATED : July 6, 2004
INVENTOR(S) : Yukio Kaji It is certified that error appears in the above-identified patent and that said Letters Patent is hereby corrected as shown below:

Column 2, Line 3, after "means" insert -- . --.
Column 10, Line 7, after "data" insert -- . --.
Column 12, Line 29, delete "2n black" and insert -- 2n = black -- therefor.
Column 13, Line 13, after "as shown in FIG. 7" delete ",".
Column 13, Line 36, delete "2(n-1) white" and insert -- 2(n-1) = white -- therefor.
Column 15, Line 63, delete "2NX" and insert -- 2N-X -- therefor.
Column 28, Line 62, delete "Wit" and insert -- With -- therefor.
Column 30, Line 50, delete "(H and L)by" and insert -- (H and L) by -- therefor.
Column 33, Line 59, delete "drawling" and insert -- drawing -- therefor.
Column 35, Line 67 (claim 1, line 8), delete "end" and insert -- and -- therfor.
Column 36, Line 20 (claim 1, line 28), delete "mad" and insert -- read -- therefor.
Column 37, Line 40 (claim 5, line 14), delete "end" and insert -- and -- therefor.

This certificate supersedes Certificate of Correction issued November 21, 2006.

Signed and Sealed this

Ninth Day of January, 2007

JON W. DUDAS
*Director of the United States Patent and Trademark Office*